(12) United States Patent
Lang et al.

(10) Patent No.: US 8,682,047 B2
(45) Date of Patent: Mar. 25, 2014

(54) METHOD AND APPARATUS FOR MACHINE VISION COUNTING AND ANNOTATION

(75) Inventors: David A. Lang, Commerce Township, MI (US); David A. Yanez, Livonia, MI (US)

(73) Assignee: Illinois Tool Works Inc., Glenview, IL (US)

( * ) Notice: Subject to any disclaimer, the term of this patent is extended or adjusted under 35 U.S.C. 154(b) by 219 days.

(21) Appl. No.: 13/310,952

(22) Filed: Dec. 5, 2011

(65) Prior Publication Data

US 2013/0141566 A1      Jun. 6, 2013

(51) Int. Cl.
 *G06K 9/00* (2006.01)
(52) U.S. Cl.
 USPC ............................................ 382/128; 382/192
(58) Field of Classification Search
 None
 See application file for complete search history.

(56) References Cited

U.S. PATENT DOCUMENTS

| | | | |
|---|---|---|---|
| 4,446,481 A | 5/1984 | Edamatsu et al. | |
| 4,597,091 A | 6/1986 | Blake | |
| 5,422,831 A | 6/1995 | Misra et al. | |
| 5,440,648 A | 8/1995 | Roberts et al. | |
| 5,558,231 A | 9/1996 | Weier | |
| 5,671,262 A | 9/1997 | Boyer et al. | |
| 5,684,999 A * | 11/1997 | Okamoto | 704/9 |
| 5,834,203 A * | 11/1998 | Katzir et al. | 435/6.19 |
| 6,535,637 B1 | 3/2003 | Wootton et al. | |
| 6,610,973 B1 | 8/2003 | Davis, III | |
| 7,599,516 B2 * | 10/2009 | Limer et al. | 382/100 |
| 2007/0189597 A1 * | 8/2007 | Limer et al. | 382/153 |

FOREIGN PATENT DOCUMENTS

EP     0371881     6/1990

* cited by examiner

*Primary Examiner* — Bhavesh Mehta
*Assistant Examiner* — Siamak Harandi
(74) *Attorney, Agent, or Firm* — Nelson Mullins Riley & Scarborough LLP

(57) ABSTRACT

A method of processing graphical image data representing optically scanned medication-related units may include receiving image data generated responsive to an application of light to a tray disposed a distance from an image acquisition component. The application of light may distinguish a background field from a plurality of the units disposed on the tray. The method may further include processing the image data to identify objects that correspond to respective ones of the units from the background field, counting the objects identified as corresponding to respective ones of the units, and generating an annotated image including at least a sequential number associated each one of the objects identified as corresponding to respective ones of the units.

17 Claims, 15 Drawing Sheets

METHOD AND APPARATUS FOR MACHINE VISION COUNTING AND ANNOTATION

TECHNICAL FIELD

Example embodiments generally relate to a counting system and, more particularly, relate to optically based counting machines.

BACKGROUND

There are approximately 120,000 pharmacies in the United States alone, with a current growth rate on the order of 10% per year. In some high volume pharmacies, robots are used to fill prescriptions. In some medium and low volume pharmacies, prescriptions are counted by other methods, such as manually, using weighing or counting scales, or using semi-automated apparatus such as optical beam pour through systems.

In manual counting, a pharmacist or assistant (a dispensing agent) reviews a prescription, finds the corresponding stock bottle, pours a number of units from the stock bottle, typically onto a specially-configured tray, then counts out the prescribed number of units, decanting these into a receiver bottle and returning any remaining units to the stock bottle. The receiver bottle is labeled with appropriate information, such as the prescriber's name, the name and dosage of the prescription, usage instructions, dates, and the like. This procedure is comparatively slow, and can be cumbersome.

Weighing or counting scales can quicken dispensing while providing an accurate count. With some counting scales, a first unit or known plurality of units is placed on the scale and identified as a reference weight. Next, a generally unknown number of units are placed on the scale, and the scale computes a number of units on the scale based on the reference weight. Units may be added to and removed from the scale until the desired number is indicated by the scale. It will be understood that the same operation may be performed manually, using weight readings and calculating the desired result. While generally accurate and faster than manual processes under some circumstances, a counting scale has no inherent provision for identifying damaged units, and will typically provide an integer result by including some roundoff in the computation to adjust for slight measurement discrepancies. Such devices can have reduced performance due to sample-to-sample or batch-to-batch piece weight variations, which can cause absolute count errors.

Other counting systems, such as optical beam pour through systems, also referred to as tablet counters, employ troughs and flow regulation to direct units past an optical detector, which counts the units as they slide past. Such devices may be insensitive to such errors as sample-to-sample or batch-to-batch weight variations, and may detect some types of unit defects, ignore small fragments, or otherwise include features or properties other than fundamental unit counting. Typical pour through devices rely on manual interaction by the agent during the pour through process, and may require rerunning a count, which may include transferring the units from the destination container to an intermediate container and pouring them back through, if more than the prescribed number of units are poured through initially.

Tradeoffs in using known weight-based and optical systems can include control of contamination, management of detected unit defects such as fragments of various sizes, and calibration requirements. While weight-based systems require periodic calibration to ensure accuracy, optical systems are substantially insensitive to drift characteristic of weight transducers. This may be offset by size and cost considerations, wherein pour through optical systems demand comparatively heavy use to justify the resource commitment involved.

Accordingly, there is a need in the art for a counting system for pharmacy and other applications that integrates in a self-contained apparatus a machine-vision-based unit detector with associated control and message management functions.

BRIEF SUMMARY OF SOME EXAMPLES

Some example embodiments may provide a machine vision counting and annotation system. In this regard, for example, a counting device is provided that can use vision based techniques to count pills disposed on a tray and exposed to a light. Thereafter, some example embodiments may generate image data based on an image taken when the light is exposed to the tray. The image data may then be annotated to number the pills and associate the image with other useful data.

In one example embodiment, a method of processing graphical image data representing optically scanned medication-related units is provided. The method may include receiving image data generated responsive to an application of light to a tray disposed a distance from an image acquisition component. The application of light may distinguish a background field from a plurality of the units disposed on the tray. The method may further include processing the image data to identify objects that correspond to respective ones of the units from the background field, counting the objects identified as corresponding to respective ones of the units, and generating an annotated image including at least a sequential number associated each one of the objects identified as corresponding to respective ones of the units.

In another example embodiment, a machine-vision based counting device for counting medication-related units is provided. The device may include a tray, an image acquisition component and an image processor. The tray may be disposed on a base unit to receive units. The image acquisition component may be disposed a distance from the tray. The image acquisition component may be configured to generate image data responsive to an application of light to the tray. The application of light may distinguish a background field from the units disposed on the tray. The image processor may include processing circuitry configured to process the image data to identify objects that correspond to respective ones of the units from the background field, count the objects identified as corresponding to respective ones of the units, and generate an annotated image including at least a sequential number associated each one of the objects identified as corresponding to respective ones of the units.

In another example embodiment, a computer program product is provided. The computer program product may include at least one computer-readable storage medium having computer-executable program code instructions stored therein, the computer-executable program code instructions comprising program code instructions for receiving image data generated responsive to an application of light to a tray disposed a distance from an image acquisition component. The application of light may distinguish a background field from a plurality of the units disposed on the tray. The computer program product may further include program code instructions for processing the image data to identify objects that correspond to respective ones of the units from the background field, counting the objects identified as corresponding to respective ones of the units, and generating an annotated image including at least a sequential number associated each one of the objects identified as corresponding to respective ones of the units.

Some example embodiments may improve the performance of a vision-based medication counting machine. Moreover, some embodiments may provide the operator with an improved experience by providing easy to use annotations to further the utility of data generated responsive to a counting operation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
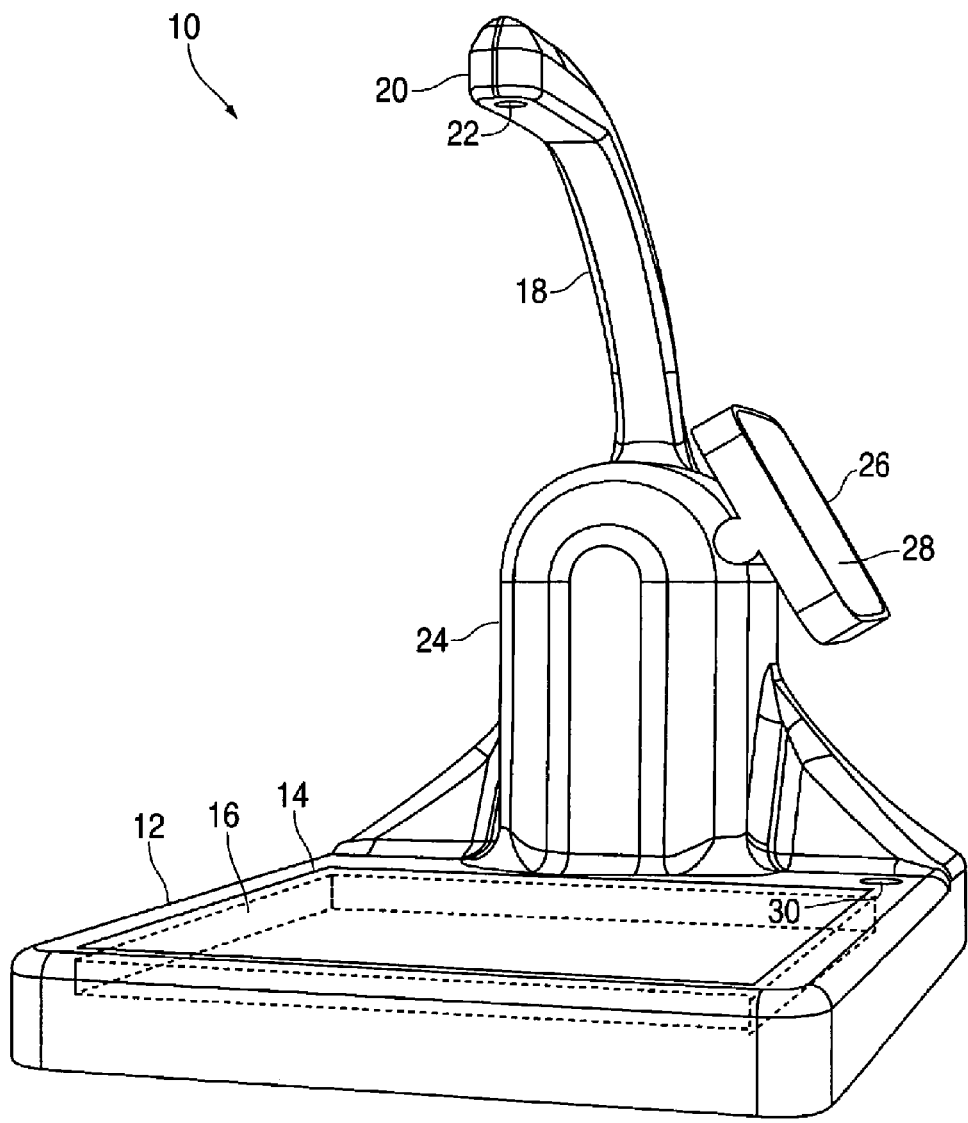
FIG. 1 is a perspective view of a counter according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the performance of a vision based counting machine. In this regard, for example, some embodiments may provide an apparatus that in some embodiments provides a self-contained unit counter with an illuminated stage, a camera, an image analyzer, a touch-screen display/operator interface, and a communication link to an external environment. In some embodiments, the unit counter may be configured to count pills and generate an annotated image as described in greater detail below.

FIG. 1 shows a first embodiment of a counter 10, having a base 12 for placement of the counter 10 on a surface. The counter 10 includes a stage 14 for positioning of units to be counted, an illuminator 16 oriented to provide illumination upward from the upper surface of the stage 14, and a neck 18, extending upward from the vicinity of the stage 14, that positions an imager head 20. The imager head 20 affixes and directs an image acquisition component (imager) 22 toward the stage 14, permitting the imager 22 to acquire an image of any materials placed on the stage 14 and backlit by the illuminator 16. A circuit housing 24, configured to enclose electronic circuitry for operation of the counter 10, is, in the embodiment shown, at least partially integrated into the structure of the counter 10. An operator interface cluster 26, configured to provide display and input for a user, is likewise integrated at least in part into the structure of the counter 10. The operator interface cluster 26 includes a display 28 that may be tiltable, and that may include touch screen function in some embodiments. A power control in the form of a low-profile pushbutton switch 30 is positioned on the surface of the base 12. The counter 10 of FIG. 1 is in the form of a single, unitized apparatus including the base 12, the stage 14 and illuminator 16, the imager head 20, a processor contained within a circuit housing 24, and an operator interface 26.

Figure 2:
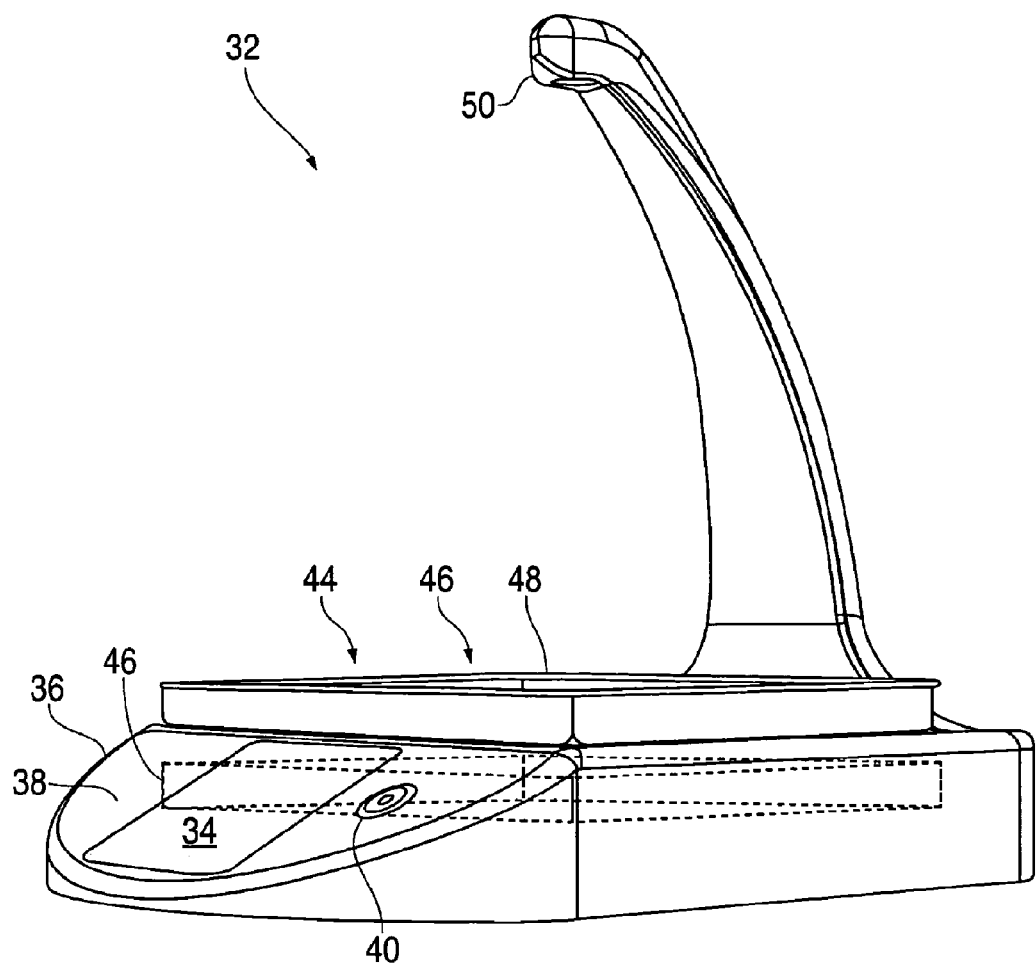
FIG. 2 is a perspective view of a counter according to another example embodiment.

FIG. 2 shows a second embodiment of a counter 32. This embodiment differs from the embodiment of FIG. 1 in having an operator interface cluster 34 integrated into a base 36 on a sloped face 38 thereof, while a power switch 40 is located adjacent to the operator interface cluster 34. Electronic components for controlling the counter 32 are located within the base 36, beneath a stage 44 and an illuminator 46, rather than in a housing 24 integrated in part into the neck 18 as shown in FIG. 1. Shown in this embodiment is a user-supplied and user-removable tray 48, which tray 48 may be washable, sterilizable, and/or disposable, and which is substantially transparent over at least a floor area thereof-that is, a bottom surface surrounded at least in part by walls-to such portion of the electromagnetic spectrum as is used for illumination. Such a tray 48 may be smaller in extent than the illuminator 46 in at least some embodiments, which may tend to prevent units from resting thereon without being detectable. The tray 48 may be self-aligning in some embodiments, such as by fitting into a similarly-sized recess in the surface of the stage 44, by having alignment fittings in the tray 48 and stage 44 that establish a preferential position for the tray 48 on the stage 44, or by having another alignment provision. A tray 48 similar to that shown in FIG. 2 may be suitable for use with embodiments such as those of FIG. 1, above, and FIG. 3, below, as well. The counter 32, like the counter 10 of FIG. 1, is in the form of a single, unitized apparatus including, in this embodiment, an imager head 50, the stage 44 enclosing the illuminator 46, a controller contained within the base 36, and the operator interface 34. The stage 44, illuminated from below by the illuminator 46, constitutes a background field for units placed on the stage 44, allowing the imager head 50 to be limited in its field of view to the area so illuminated.

Figure 3:
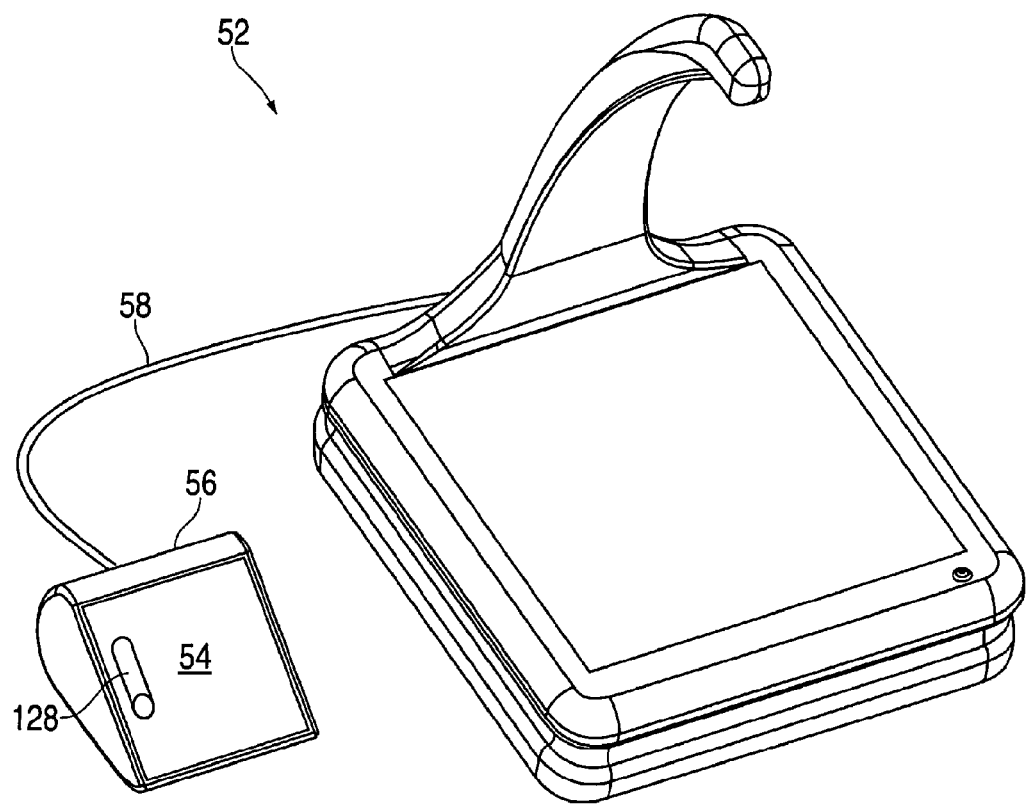
FIG. 3 is a perspective view of a counter according to another example embodiment.

FIG. 3 shows a counter 52, substantially similar to the counters 10 of FIGS. 1 and 32 of FIG. 2, wherein an operator interface 54 is located on a pendant 56 connected to the counter 52 by a cable 58. This arrangement, or a similar one wherein the pendant 56 is connected using a wireless link and may be separately powered, may be used in lieu of a more fully integrated apparatus in some applications. An orientation sensor 128 or selector may be provided, and may have the form, for example, of a tilt switch or absolute accelerometer embedded within the pendant 56, or may consist of a setup option for the processor. A display orientation provision based on such a selector or sensor may be used in some embodiments to rotate the display image for some pendant 56 orientations, such as converting from sitting on a table with the cable 58 behind to hanging on a wall hook with the cable 58 below.

Figure 4:
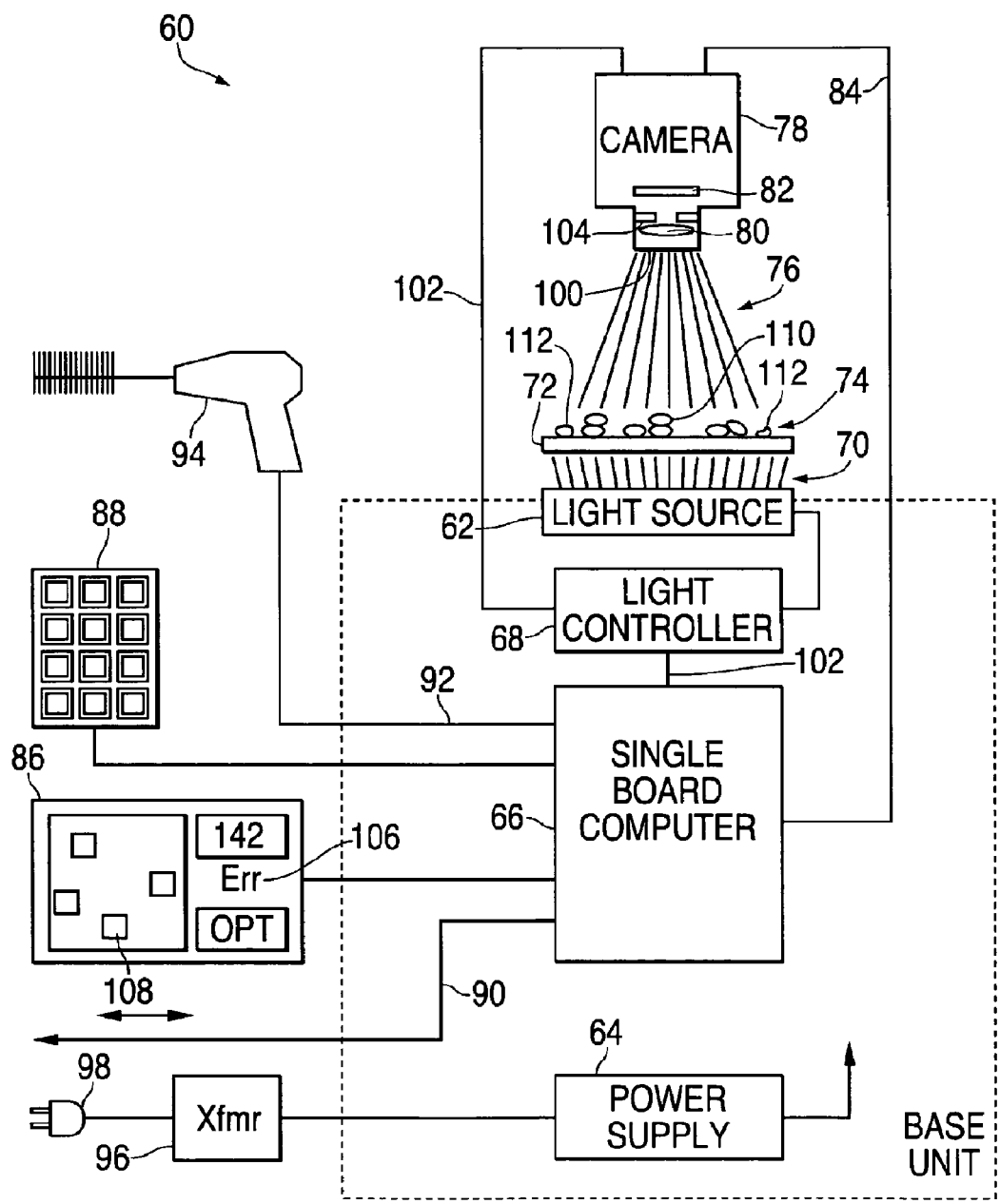
FIG. 4 is a block diagram consistent with a method according to an example embodiment.

FIG. 4 shows a counter 60, in block diagram form, having some of the functional elements indicated in the foregoing pictorial figures. The counter 60, like the counters 10 of FIG. 1, 32 of FIGS. 2, and 52 of FIG. 3, can take the form of a single, substantially unitized apparatus. As shown in the block diagram, an illumination source 62 powered from a power supply 64 with timing controlled from a processor module 66, and in some embodiments including a discretely identifiable illumination source power control module 68, emits radiation 70, such as infrared light, that passes through a stage 72 and is blocked in part by subject units 74 (e.g., pills). A portion of the unblocked radiation 76 impinges on a camera 78, functioning as an image acquisition component, whereof a focusing mechanism 80 such as a pinhole or a lens may be used to place an image in the form of silhouettes of the units 74 on a detector 82, functioning as a machine vision transducer. The detector 82 couples the image in a transferable format such as a digital data stream to the processor module 66. The image is coupled via a power and communication link 84 such as a power-carrying electrical data signal cable or a combined power cable and fiber optic link in the embodiment shown. The processor module 66 further interprets the camera 78 image to generate a count of units 74 at periodic intervals. This count may be presented on a display component 86, and may be updated at a rate determined by a control routine stored within the processor module 66 or determined by input from a user, for example.

Additional functions of a counter 60 may include provision for local control input using a keypad 88. Such a keypad 88 may in some embodiments have the form of a touchpad overlay, that is, an array of substantially transparent pressure transducers or a functionally equivalent device, providing output usable in place of pushbutton switch contacts, with the touchpad superimposed on the display component 86. Functions in some embodiments may also include one or more external communication links 90, whereby, for example, the counter 60 may operate a system or the system may operate the counter 60, as appropriate for an application. Such relationships are commonly described as master and slave; as appropriate, a counter 60 may selectably perform either master or slave function or may be limited to one or the other.

In some embodiments, another included interface 92 may support an optical reading device, such as a barcode scanner 94. Power for operating the counter 60 may be self-contained, using some combination of replaceable, rechargeable, and/or solar batteries included in the power supply function 64, may be externally powered using direct or indirect (such as from an external transformer 96) feed from a premises wiring plug 98, or may be otherwise energized, as selected for a particular use.

The illumination source 62 may, in some embodiments, provide electromagnetic energy in the form of infrared light at low average intensity and with a time-controlled, low duty cycle emission envelope. Where so implemented, the radiative intensity can be "strobed," that is, pulses of light can be emitted having a selected rate, duration, and emission intensity envelope. In strobed configurations, overall emission may be substantially lower than would be the case were the illumination source 62 operated continuously at an emission level compatible with a particular camera 78. This may, in some embodiments, allow a high enough illumination level for efficient operation of the camera 78, while lowering the net power radiated and/or conducted downward into any electronic devices housed below the source 62. This can in turn reduce component stress, extend component life, reduce overall power consumption and power supply size and weight, and/or reduce tendencies for susceptible components to drift in value with temperature. Strobe capability may further allow operation without a cooling/air distribution fan in some embodiments. A low duty cycle, high intensity backlight may also serve to reduce the effects of any ambient light that might otherwise make pills appear less dark as a result of their being illuminated on their top (camera illuminated) side.

In some embodiments, a planar array of infrared light emitting diode (LED) devices, substantially matched for uniformity of emission intensity and wavelength, and affixed below the stage 72, may be used to establish a diffuse illumination source 62. In other embodiments, a single, possibly higher intensity device, effectively a point source, the emission from which is distributed and directed by a lens, a focusing reflector, or a combination of such accessories, for example, may be used as the illumination source 62.

Light having a wavelength outside the infrared portion of the spectrum may be used in some embodiments. Illumination may likewise be of multiple wavelengths, such as white light. One or more downward-directed illumination sources, such as, for example, ambient room light or a second light source at camera 78 level (shown also as source 116 and camera 118 in FIG. 5), may permit one or more attributes of the units 74 in addition to quantity and/or shape to be detected, such as color, transparency, imprint symbols, and the like. In embodiments having a plurality of light sources and/or a source emitting a plurality of colors, reflected light in addition to or in place of silhouette illumination may be detected. Such capability may in some embodiments permit or enhance detection of flawed or incorrect units in a sample, for example. The camera 78 of FIG. 4 may acquire a reference brightness level when the stage is empty, then use the reference level to establish contrast levels during counting.

Illumination using energy other than infrared and visible light may be used in some embodiments. Within the electromagnetic (EM) spectrum, microwave radiation (i.e., EM waves longer than infrared) may provide adequate resolution in some embodiments, while ultraviolet light (UV, EM above visible) or x-rays may be usable in other embodiments. Acoustical energy, such as ultrasonic emission, can have wave dimensions and power levels permitting acquisition of an image of a stage whereon a number of countable units are placed, with sufficiently high resolution and image refresh rate to meet system needs. Still other imaging methods and media may likewise be applicable in some embodiments.

Contrast between the appearance of the surface of the stage 72 and of the units 74 being counted may be further enhanced, particularly in a high ambient light level or broad-spectrum light environment, by positioning one or more filters 100 having properties suitable for limiting light impinging on the detector 82 to spectral elements of interest. For an infrared source 62 illuminating a detector 82 that is insensitive and thus self-filtering for spectral elements longer in wavelength than the far infrared, an infrared low pass filter may be used, while for embodiments wherein multiple spectral elements are to be detected, combinations of low pass and/or band blocking (notch) filters may be used. It is to be understood that a single filter 100 combining multiple notch filters and bandpass or lowpass filters may be used in some embodiments.

In embodiments using strobing, synchronization by a sync signal line 102 may be directed from a relevant circuit element such as the processor 66 or the power control module 68 to the camera 78. Applying the sync signal to the camera 78 allows image acquisition to be synchronized to the availability of light from the source 62. The strobe function can reduce energy flux and gradient into the units being counted, thereby impeding degradation for some heat-sensitive, light-sensitive, or short-life medications or packaging configurations.

Some light sources 62 provide a substantially uniform areal brightness distribution, and further provide rapid turnon and turnoff of emission. Other light sources 62 may provide illumination compatible with data acquisition properties of specific types of detectors 82. For example, a detector 82 may intrinsically perform raster scanning over an image area, that is, acquire data from an array of picture elements by sequentially reading instantaneous brightness values from the elements, getting a succession of values across a single row of the detector 82, then advancing to the next row and repeating the process. For such a detector 82, only an area of the source 62 optically focused on the portion of the detector 82 being read need be activated, further reducing power consumption and emission. For another type of detector 82, the entire detector surface may be illuminated and may capture an image in the form of electrical charge on discrete picture elements, after which the image may be transferred by a process such as "bucket brigade" charge transfer with the relatively low brightness of reflected ambient light continuing to impinge. For this latter type of detector 82, a uniform illumination pulse over the surface of the source 62 may be used. Other detector 82 technologies may dictate still other modes of operation of the source 62.

Light emission may be substantially random in phase and direction for some illumination sources 62. For source 62 embodiments having comparatively uniform emission distribution over the surface of the source 62, or having comparatively uniform areal intensity striking the camera 78, signal processing may be simplified compared to signal processing required for sources 62 having pronouncedly nonuniform emission. In embodiments having less uniformity, either over the source 62 surface or over apparatus lifetime, a baseline surface mapping can be established and refreshed periodically as appropriate, to precompensate for source 62 variation. Furthermore, in some embodiments, adjusting emission intensity or emission pulse duration can be used to regulate signal input level into the camera 78 to remain within a range. In some embodiments, the camera 78 may allow detector 82 sensitivity to be controlled over portions of the image area of the camera 78, so that precompensation for source 62 areal intensity variation may be performed prior to providing the image information from the camera 78 to the processor 66. Similarly, impinging light may be regulated or switched using a mechanical or electrochromic shutter 104.

Figure 5:
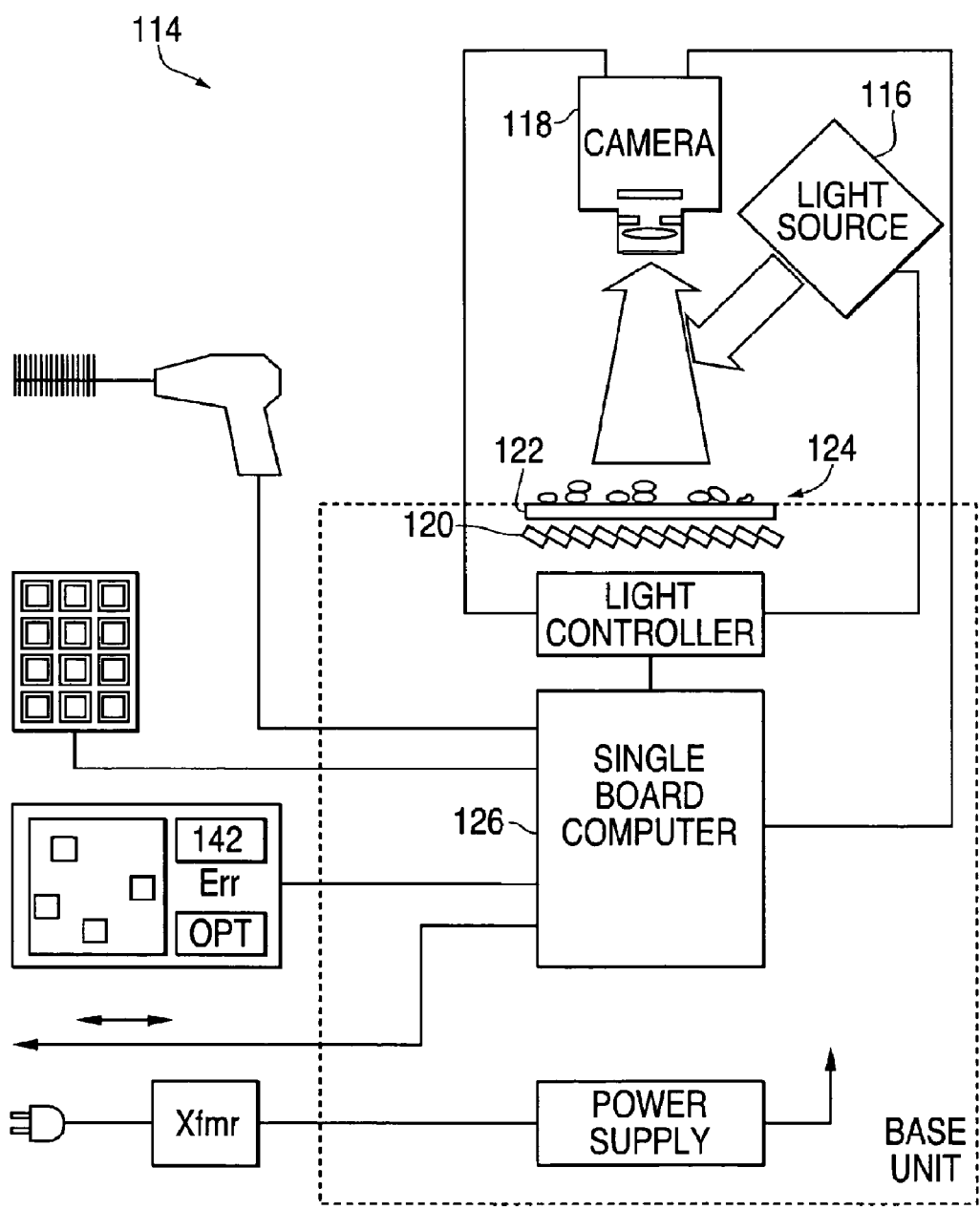
FIG. 5 is a block diagram of an alternative example embodiment.

FIG. 5 is an example of another embodiment 114, wherein a source 116 is positioned substantially at the level of the camera 118, for example. Such a source 116 may be diffuse, that is, may have largely uniform and low energy density emission over a relatively broad surface, or may approximate a point source, that is, may emit with comparatively high energy density from a small spot. Each such configuration, as well as intermediate forms such as multiple discrete spot sources, may be superior in conjunction with particular imaging methods.

For some embodiments, a passive reflector 120 beneath the stage 122, which may be focused, can be used to reflect light from the source 116 back to the camera 118, with deflection or diffusion of the light by the units 124 providing contrast. The reflector 120 in FIG. 5 is a collapsed type, such as a metalized negative Fresnel lens; other configurations are feasible as well. The size shown for the reflective components of the reflector 120 is larger in FIG. 5 than in some embodiments, with the understanding that finer scale reflective components can more readily establish a low-profile, accurately focused mirror, while components comparable in scale to the units being counted may be preferable for other embodiments. For still other embodiments, a stage or substage surface that largely absorbs or deflects the wavelength of the source 116 can be used, so that the units 124 are seen by the camera 118 as brightly lit against a relatively dark background. The last embodiments could require an adaptation of the processor 126 algorithm to account for discrete specular reflections from gel capsules, coated pills, and other shiny unit surfaces, for example. Similarly, variations in reflectivity of subject units may require added camera bit depth or processor algorithmic complexity in some such embodiments. Embodiments using reflectors 120 beneath the stage 122 could be unsuitable for counting some types of reflective units unless the position and other attributes of the illumination source were arranged to accommodate such uses, such as by offsetting the source 116 with respect to the central axis of the camera 118 field of view.

In still other embodiments, comparable resolution and speed may be achieved using a narrow, directable spot of light, such as a laser beam within the source 116, directed over an area using a Micro Electro Mechanical System (MEMS) or another beam steering system. In such an embodiment, the beam is scanned over the stage, and the scan result is detected by a "camera" 118 that can be as simple as an unfocused single-element photodetector. Such an embodiment may use silhouette, reflection, or combined imaging, and may use a plurality of light sources of different wavelengths. The analytical algorithm for evaluating an image so acquired, discussed below, may also be adapted, such as by performing a low-resolution scan with the beam to find unit candidates, then edge tracing or rescanning at higher resolution to evaluate areas of interest. The process may further vary spot size.

In some embodiments, an areal counting function may be executed repeatedly at selected intervals, with count results on the display 86 of FIG. 4 then updated, for example after completion of each count. For sufficiently rapid count intervals, such as multiple times per second, the update rate may appear to a user to be essentially continuous. As an operational consideration, such a process may allow a dispensing agent to pour out units onto the tray 54 of FIG. 2, for example, until an approximately correct count is seen on the display 86 of FIG. 4. The agent can then verify that no piles obscuring observation are present on the tray 54, and can redistribute the units if necessary, with the results presented effectively instantaneously at each step.

In some embodiments, in addition to providing a count of discretely identifiable units interrupting illumination over several consecutive scan lines at a broadly uniform position with reference to a first end of the scan lines, a processor 66 may provide an inspection function. That is, the processor 66 may be configured to anticipate the approximate areal coverage or "blob size" of the units being counted, and to determine for each discretely identifiable unit whether the size generally corresponds to that expected for such a unit, in consideration of a range of orientations of the unit. Thus, for example, where unit size is too small to be consistent with any anticipated orientation for that unit, the unit may be tagged as possibly chipped or a fragment. Similarly, where a unit occupies a large enough region but shows a shape that is nonuniform, exceeds a stipulated range of rates of curvature, or otherwise exceeds geometric model limits, the unit may be tagged as possibly defective. Such information may be presented on the display 86 of FIG. 4, variously in text form 106 or as a graphical image 108 showing the general location of a suspected fragment 112. Fragments below a stipulated size may be ignored in some embodiments.

Compound element images may be identified as multiple discrete units through application of geometric pattern matching functions. Where predefined or other geometric patterns can be detected within a compound element image, the patterns can be classed as units within the image. The patterns defined by these units may be, in effect, subtracted from the image, leaving the areas obscured by the patterns indeterminate, i.e., classed as neither illuminated nor part of the silhouette image. The remaining image may then have the pattern matching function further applied, and other patterns may in turn be identified. Such an iterative process may in some embodiments permit compound images to be partitioned and counted with acceptable accuracy, and may further allow identification of broken pieces of units. The process may further identify and tag extraneous items—that is, items not having geometric patterns corresponding to units or combinations of units—with these omitted from a count. This process may be termed discrimination between patterns.

In some embodiments, the processor 66 may identify touching or overlapping units, allowing counting of units within multi-unit groups in some configurations and directing an agent to scatter such groups where likelihood of accurate counting is unacceptably low. It will be understood that a limit on such capability may occur where units such as flat-faced pills-squat cylinders-are stacked 110 substantially perpendicularly to the local view axis of the camera 78, as shown in FIG. 4. Such configurations may reduce the efficiency of the counting machine despite use of procedures outlined above. Additional procedures such as the one discussed below may restore efficiency.

In some embodiments, the processor 66 acquires a unit count over multiple sample cycles, during which interval the agent may add units to the stage 72. The processor 66 compares unit counts in successive sample cycles, with successive counts typically increasing in value. Where a final count target is known, the agent may need to add or remove units after a stable count is established. Under some conditions, a count may be observed to decrease anomalously, which may result from stacking 110. A processor 66 detecting such a condition may present a message to the agent directing that the units be spread, and may further indicate one or more regions on the stage 72 as appropriate.

Figure 6:
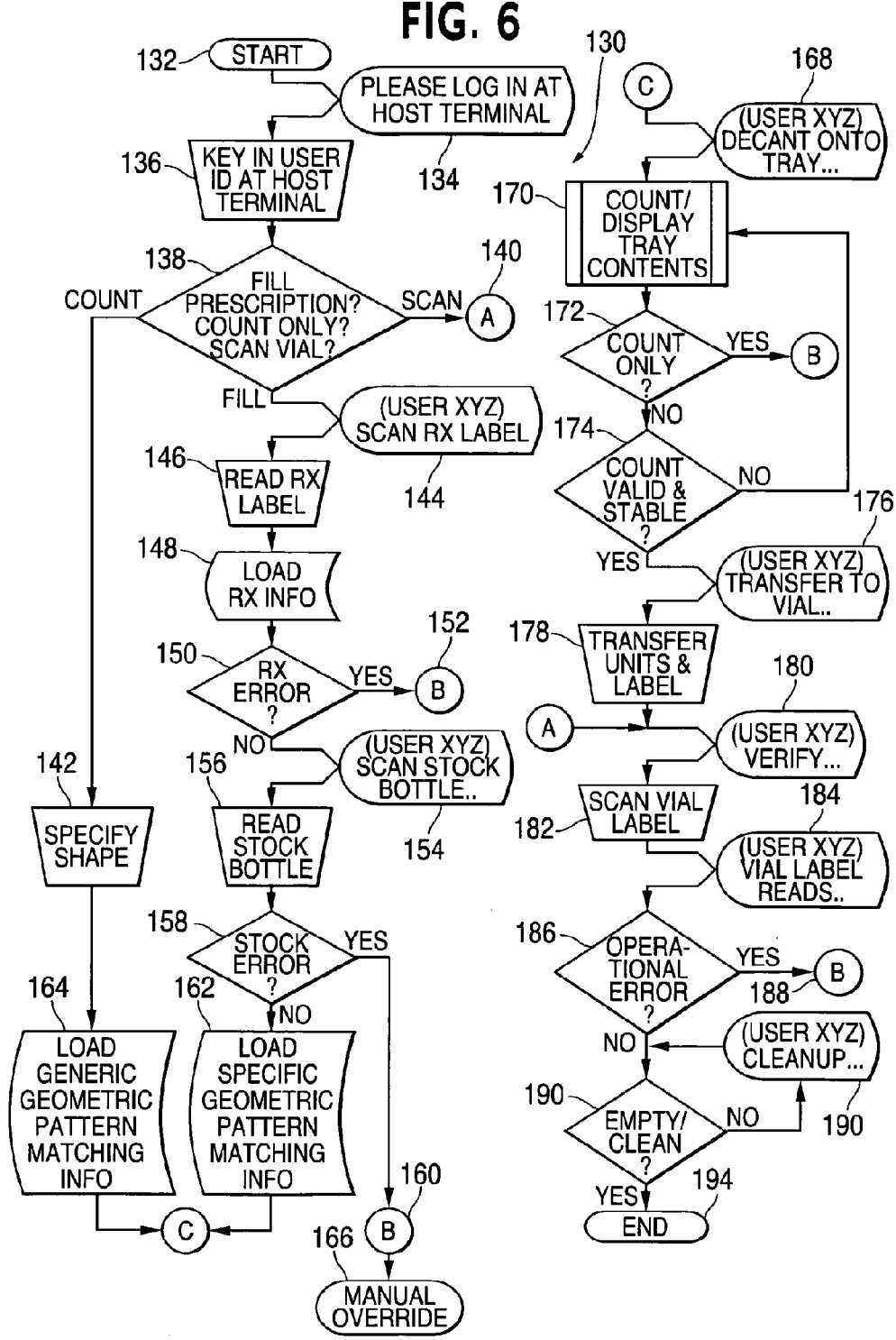
FIG. 6 is a flowchart indicating a procedure followed by a counter operating according to an example embodiment.

FIG. 6 shows default overall signal flow according to one embodiment of the invention. After initialization 132, an agent is prompted 134 to perform a login function 136. Note that in a standalone system configuration or a configuration wherein the counter in use is the master, the term "host terminal" may apply to the counter itself. For such applications, the counter can support digital data entry, such as for login, as a function of the display 86 and of the touchscreen or keypad 88 of FIG. 4. For other embodiments, a host separate from the counter may provide login confirmation input through the communication link 90 of FIG. 4.

Once an agent (here, USERXYZ) is recognized, task options 138 may include, in some embodiments, filling a prescription (Rx), performing a count on units not associated with a prescription, and scanning an existing prescription vial. Where the task is limited to scanning an existing vial, count processes are bypassed, and execution jumps 140 to a later node in the routine. Where the task is to count units, indication of unit shape may be provided 142 by the agent to the counter 130. Where the unit shape is known, the agent can select the shape from a menu referencing a database, for example. Where the unit shape is not available from a resource, the shape can be specified for the task by defining a geometry in terms of curvature, diameter, and the like, defaulting to a nominal shape and size, or another method.

Where the task is to fill a prescription, the counter can prompt the agent 144 to scan 146 a reference document such as a previously prepared prescription label. For some embodiments, a method for scanning may use the bar code scanner 94 of FIG. 4 to read a bar code printed on the label. In other embodiments, the scan process may involve keypad entry of a reference number, or may require entry of text such as prescriber's name, formulation, quantity, and the like, with a label being printed, as a response to the input, using a printer external to the counter.

After the prescription label information is acquired, associated information may be loaded 148 from a reference resource external to the counter, using, for example, the external communication link 90 in FIG. 4. In other embodiments, some or all of the associated information may be contained in a database internal to the counter 10. The loaded information may be evaluated for some classes of errors 150, such as an unauthorized or already-filled prescription, and, if defective 152, brought to the attention of the agent 160, 166. Where the information is proper, the counter can prompt the agent 154 to scan 156 a stock bottle (a bulk storage container for a prescription), using the method previously used 146 for the label. If the stock bottle is incorrect 158, the agent is directed to intervene 160, 166; if correct, geometric pattern information for the units may then be loaded from a database 162, where the database information is maintained within or external to the counter. At this point, the generic counting option and the prescription filling option paths from step 138 converge, with a geometric pattern not associated with a prescription loaded 164, and the procedure continuing to the count phase.

The agent is then directed 168 to decant the units into the tray, after which the count function loop described in FIG. 6 is invoked 170. If the procedure is only a count 172, then the loop may be limited to a single execution pass. If not, the loop may instead monitor the decanting process by repeatedly executing the counting process 170 until a valid count is achieved 174, discussed in detail below. To complete the procedure, the agent is directed 176 to transfer the counted units (and the label, if not previously done) to the final vial 178, then to verify 180 by rescanning the label 182, which is then displayed 184. If a mistake has occurred 186, the agent is directed 188 to intervene 160, 166; otherwise, the scan surface is examined for visible contamination 190 and the agent may be prompted to clean the scan surface 192, after which the procedure is finished 194.

Figure 7:
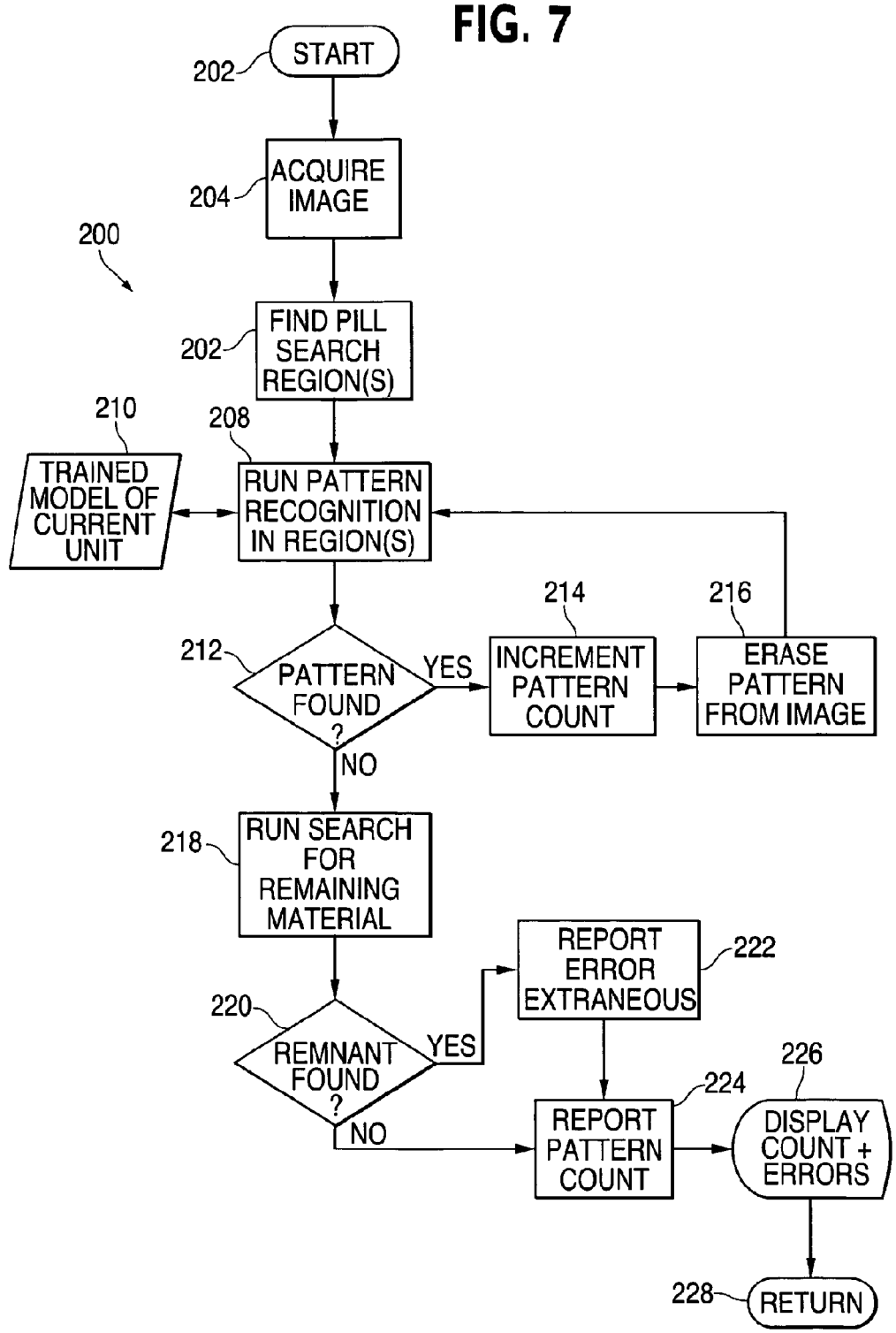
FIG. 7 is a flowchart indicating a counting procedure according to an example embodiment.

FIG. 7 shows the process for acquiring a unit count 200 based on the content of a scannable tray. As indicated in the flowchart of FIG. 6, a stock bottle reading 156 or a specific or generic shape definition 142 allows geometric pattern matching information 162 or 164 to be applied to a counting task 170. As is further shown in FIG. 7, the count function 200 is initialized 202 and a tray image is acquired 204 for the routine.

Referring again to FIG. 4, in some embodiments, the image acquisition process provides a timing signal on a signal line 102 both to activate the illumination source 62 and to initialize the camera 78 to perform a raster scan over the stage 72.

Each picture element (pixel) in the field of the camera 78 is converted from a light intensity level to an electrical signal level by the camera 78. The signals, which may be analog in form, are then digitized, either intrinsically, internally to the camera 78, or within the processor 66. In some embodiments, the digitized image may have single-bit depth, meaning that each pixel is blank or nonblank, i.e., above or below a brightness threshold. Each such image in the processor 66 may then be an array of 0's, for example, representing the unblocked source 62, and 1's, representing the silhouettes of the units 74 and any stray material. In other embodiments, multiple colors or shades of gray may be acquired, using one or more light sources 62. Images then require multiple bits per pixel: two bits to represent four discrete levels or colors, four bits to represent sixteen, and so forth. Such additional information may enhance system capability, such as by allowing pixels to be classed as partially on an edge of a unit rather than entirely on or off the edge, affording "subpixel" image resolution.

Returning to FIG. 7, the image acquired 204 is evaluated 206 for searchable (non-blank) regions. For example, bright (infrared) illumination, detected substantially uniformly over the area of the illumination source (equivalent to the stage or a background field), and potentially further restricted by identifiable edges of a tray resting on the stage, implies that the background field is empty. If one or more contrasting image elements exist in the background field, then search regions proximal to the contrasting elements may be added to a list.

A pattern recognition routine may then be executed 208 over the search regions, using as a reference a "trained model" 210 of units to be counted, corresponding generally to the specific geometric pattern 162 of FIG. 6. According to one imaging technique, a model can use a pattern of image elements having a particular extent and line-by-line relationship, implying area coverage and contiguity. According to another imaging technique, a curve-fitting algorithm can detect the locations of the light-to-dark boundaries of a pattern within a search region, and then compare these to a sequence that would obtain from an ideal point set for the model. If the aggregate error is low enough, the pattern may be affirmed as agreeing with the model. Alternative modeling strategies consistent with other techniques may be used. An untrained model may be fully effective for round, flat pills, for example, if it is assumed that the pills will be largely separated from each other, so that each pattern within a search region is distinct and supports identification. A trained model, by contrast, may anticipate multiple angular orientations, known non-circular unit shapes, and proximity between units that may leave portions of units obscured. The trained model may be a geometric approximation based on vendor literature, or may be based on images acquired using a counter according to the inventive apparatus and method, tasked to execute a training routine and add the trained model to a database.

Once a pattern is detected 212, a counter function maintaining a running count of patterns found can be incremented 214, and the image elements comprising the found pattern can be blanked 216.

The pattern recognition routine may include rejected regions as well as found patterns. That is, for a sequence that does not satisfy the criteria for a trained model, a local area or a search region can be set aside and the pattern recognition routine 208 run on any remaining search regions within the bounded background field, until all "easy" patterns have been found 212. Previously rejected search regions may be revisited, and may reveal additional patterns after blanking other patterns. Ultimately, no further patterns will be found 212. There may remain regions that are neither wholly blank nor valid. These regions may be searched 218, and may contain remnants according to criteria of the trained model. If such remnants are found 220, a report 222 may be generated, which report 222 may include location information for each such finding. Whether there are remnants or not, a report of the number of found patterns can be generated 224, and the results of the count routine can be presented for display 226, ending the procedure 228.

After completion of a single pass through the count routine 200 of FIG. 7, the counter can be configured to halt, or can repeat at a chosen rate as shown at step 172 in FIG. 6. Where the count sequence is repeated, for example at a high rate, an agent can pour units onto the tray and observe the achieved count in near real time. Where errors are indicated, the agent may manually redistribute units, and may respond to detection of suspected remnants, for example, by removing them and observing the refined count.

It is to be understood that in some embodiments, the count function may be run at a rate approximating the fastest rate of which the apparatus is capable, irrespective of conditions, while in other embodiments, a tray determined to be empty may be examined at an infrequent rate, or may be ignored until an execute command is sensed. The latter embodiments can render the counter largely inert while awaiting the start of a processing procedure such as those presented in FIG. 6, and can thereafter minimize count rate once a valid final count has persisted for a time interval. Similarly, variable counting rate may be used in event of significant errors, such as appreciable numbers of fragments, units so piled as to be uncountable, presence of shapes inconsistent with the database information for the units, or another operational problem, to slow or stop execution and present error signals.

Figure 8:
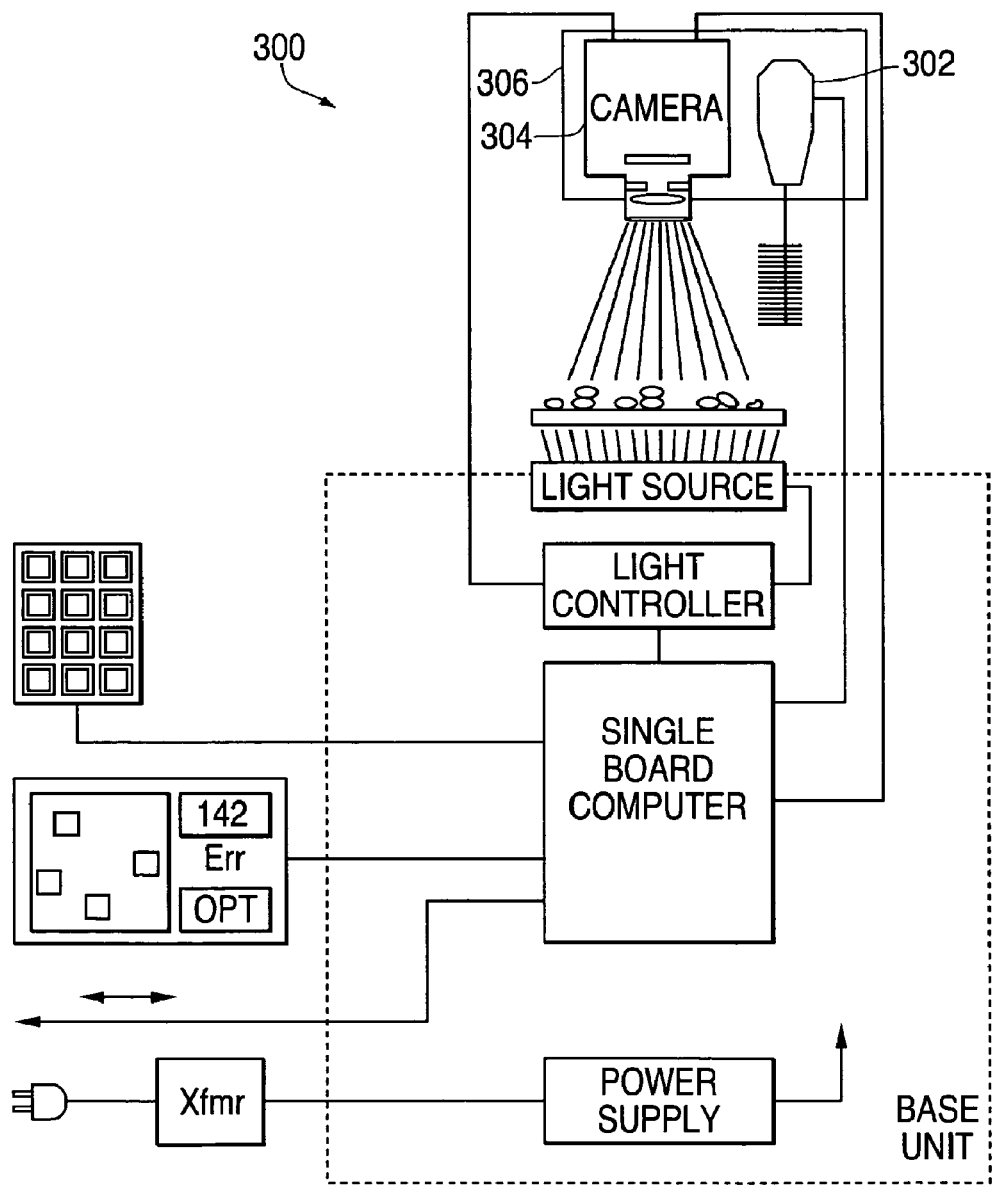
FIG. 8 is an additional alternative example embodiment in block diagram form.

FIG. 8 shows the block diagram of FIG. 4, further adapted by integrating into the apparatus 300 a data acquisition device 302. A device 302 generally similar to the bar code scanner 94 shown in FIG. 4 can be integrated into the head 304 containing the camera 306 in some embodiments. In some embodiments, the data acquisition device 302 can provide one- or two-dimensional bar code scanning by moving a self-supplied visible light source, such as a steerable laser beam, over a field such as an agent identification card or an encoded reference number on a stock bottle. The sequence of light intensities reflected from the field can then be sensed and interpreted as a string of data elements that encode selected information. The information may include that described above in discussion regarding FIGS. 4-7, such as prescriber and product codes, as well as security information. In other embodiments, the light source may be infrared, for example, or the scanning process may use a radio or magnetically coupled signal to acquire data. In some embodiments, the scan function may be performed by components also used for image acquisition.

Figure 9:
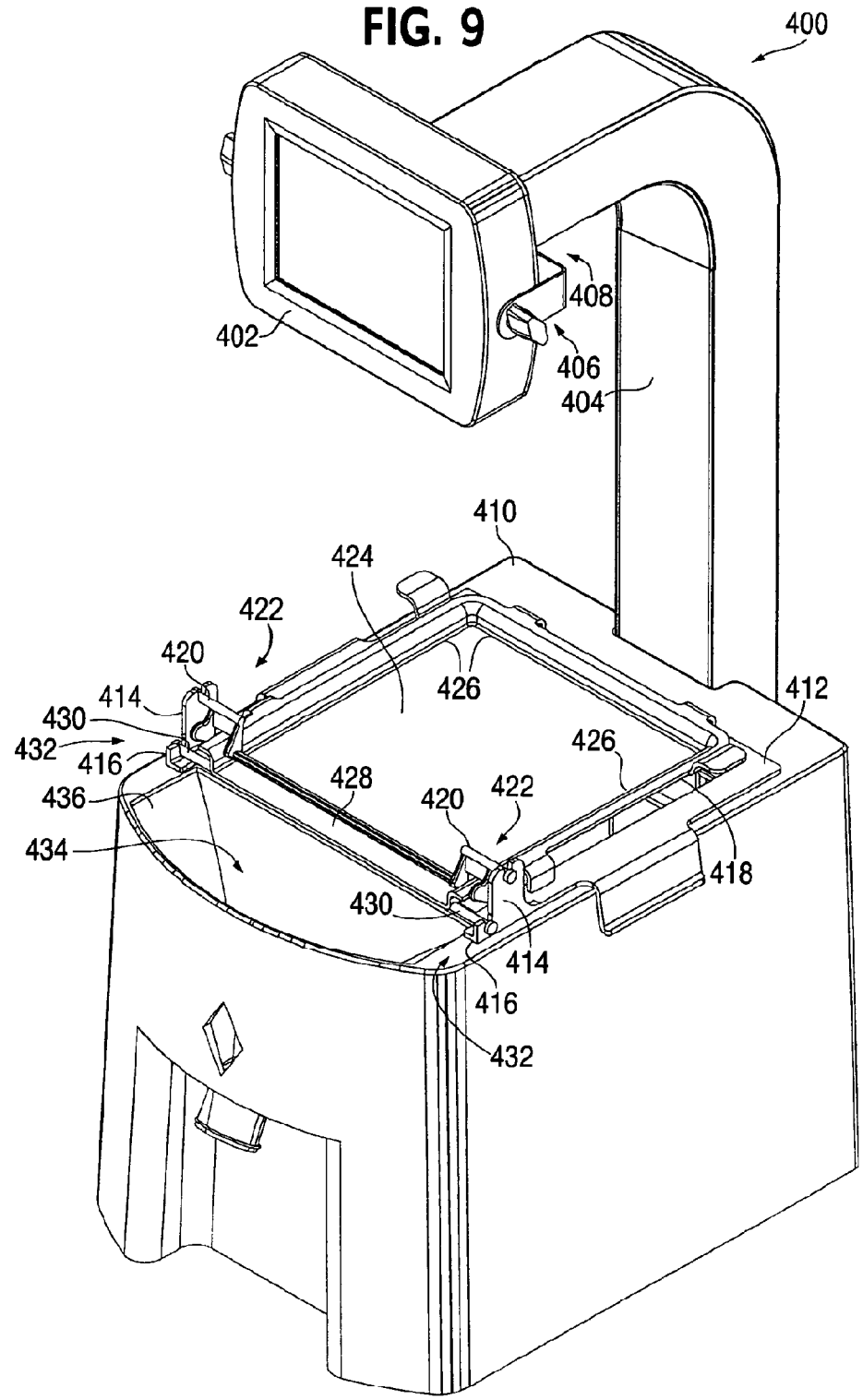
FIG. 9 is a perspective view of an additional alternative according to another example embodiment.
Figure 10:
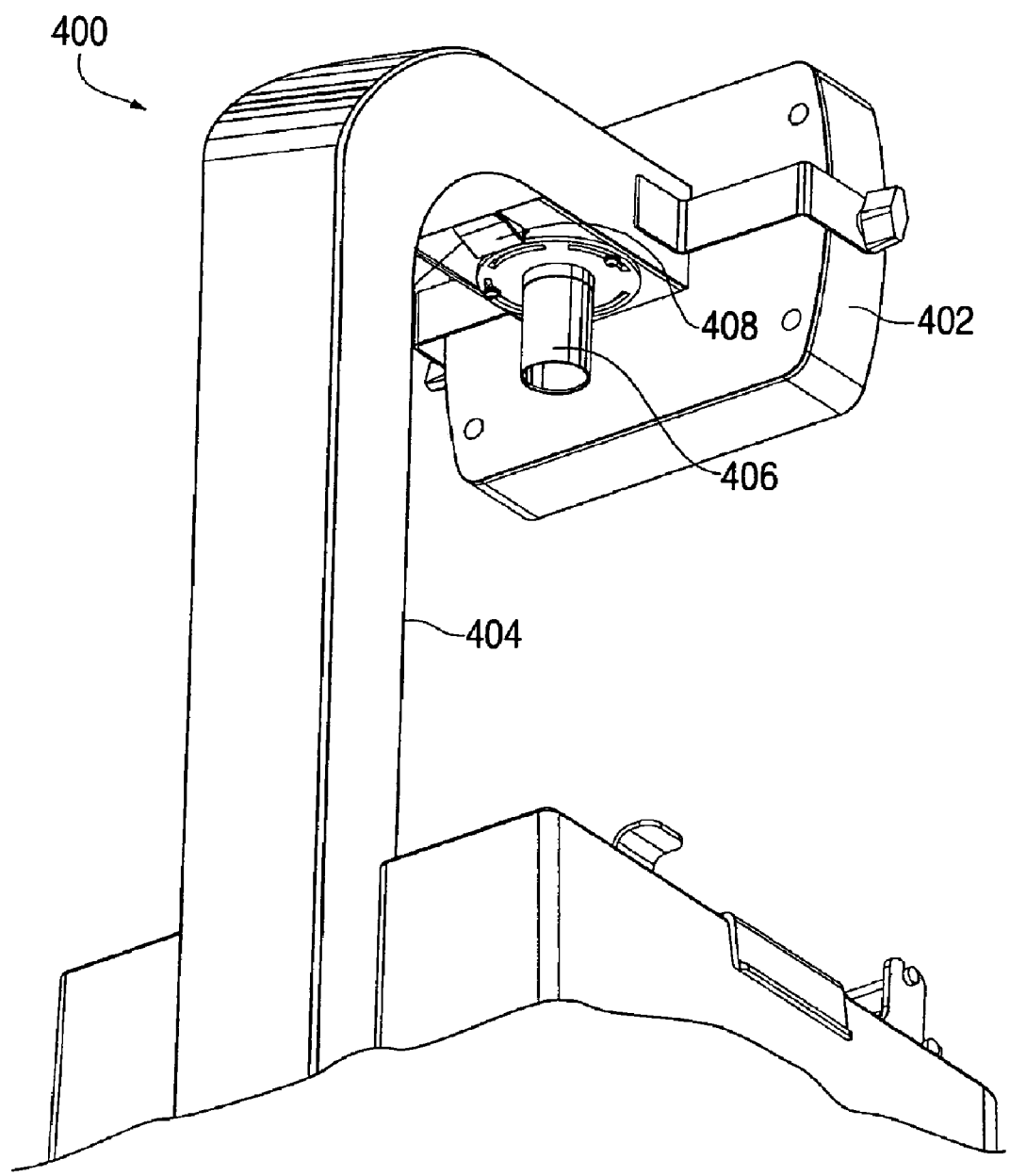
FIG. 10 is an additional view of the example embodiment shown in FIG. 9.

FIG. 9 shows a first perspective view of still another embodiment of a counter 400. In this embodiment, a display/user interface 402 is positioned at the top front of a principal support arm 404. A camera 406 and a scanner 408, visible in FIG. 10, are located on the arm 404 behind the display 402. Returning to FIG. 9, a base 410 has affixed thereto an adapter 412 having a first pair of pivots 414 and a second pair of pivots 416. First pivots 414 locate a tray 418 having a first pair of hinge pins 420 mated to the first pivots 414 to form a first hinge mechanism 422. Tray 418 has a floor 424 and three walls 426. Second pivots 416 locate a stop bar 428 that forms the fourth wall of the tray 418, with a second pair of hinge pins 430 mated to the second pivots 416 to form a second hinge mechanism 432. The base 410 further includes a guide chute 434.

Location of the display/user interface 402 with respect to the base 410 involves considerations of ergonomics as well as optical geometry. In the embodiment shown, the display/user interface 402 is positioned substantially as close as possible to the camera 406, which in turn is positioned substantially directly above the center of the base 410. In other embodiments, including, for example, those shown in FIGS. 1-3, other locations for the display/user interface 402 may be selected by those skilled in the art, in view of such considerations as display visibility and touch-screen actuation convenience.

As further shown in the embodiment of FIG. 9, an auxiliary chute 436 can be positioned within the guide chute 434. This arrangement permits the tray 418, the stop bar 428, and the auxiliary chute 436 to be the only components of the counter 400 that ordinarily come into physical contact with units being counted. By configuring these components to be readily removable, such as by lifting off the adapter 412 and withdrawing the auxiliary chute 436, the counter enables an agent to substantially completely isolate countable units of highly incompatible types. For example, capsules containing a medication in a finely divided form may have traces of the medication on the outside of the capsules, wherefrom particles could fall onto the tray 418 during counting. Other tablets or capsules counted subsequently could pick up the particles in quantities sufficient to constitute cross-contamination. By allowing the agent to remove and thoroughly clean the entire contact path with relative ease, the counter 400 configuration of FIG. 9 can be made usable for essentially any types of units. Moreover, multiple sets of contact path components can be interchanged for convenience in processing large numbers of prescriptions during peak periods, for example. Where specific considerations so dictate, contact path components can be treated as disposable.

Figure 11:
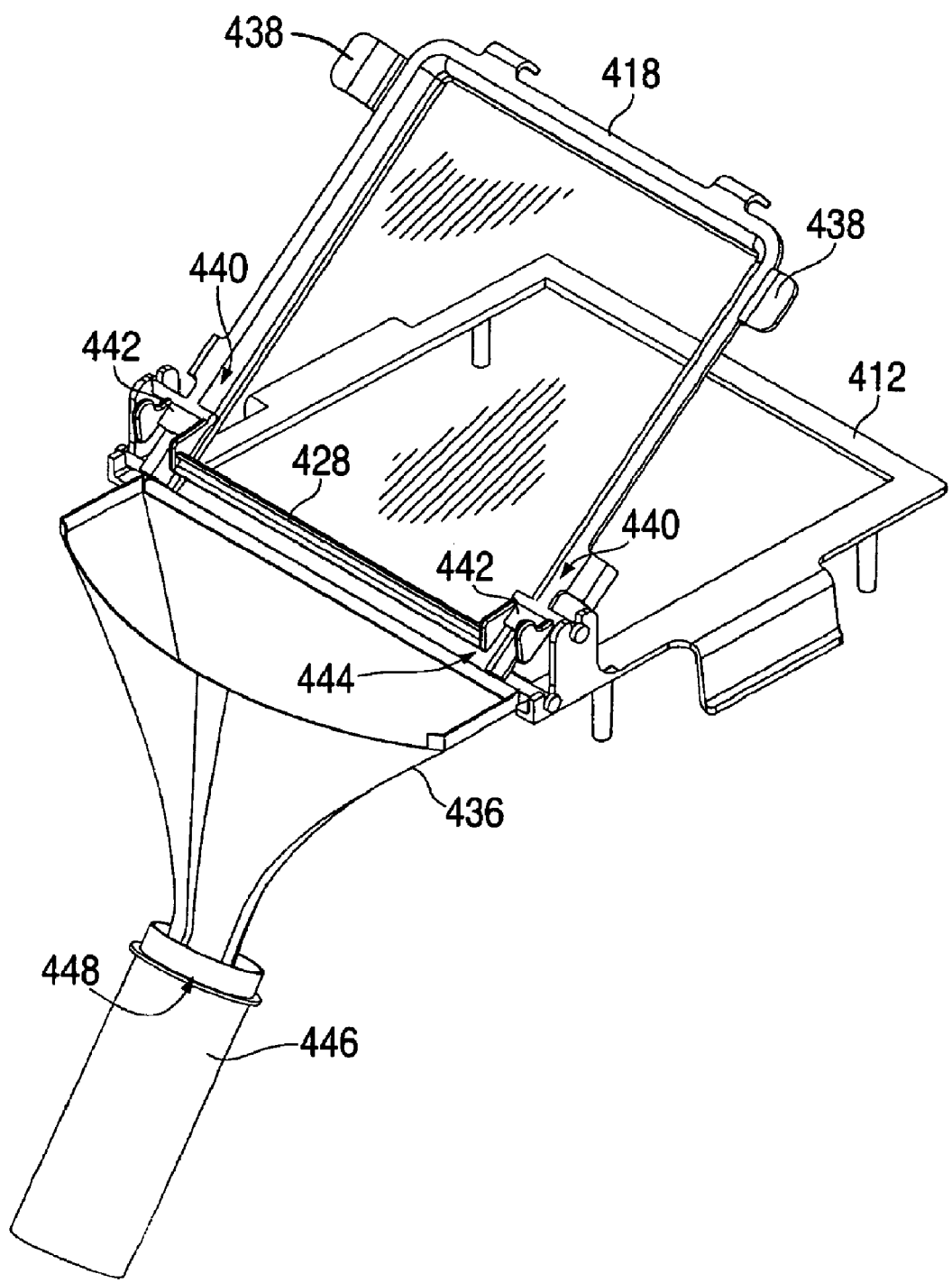
FIG. 11 is an additional view of the example embodiment shown in FIG. 9.

FIG. 11 shows a second perspective view of the adapter 412 and the contact path components 418, 428, and 436 as employed in completing a counting operation and transferring the units from the counter 400. Here, the tray 418 is shown tipped up, such as by the agent grasping and raising one of the lift tabs 438, with the motion of the tray 418 transferred to the stop bar 428 by cams 440 on the tray 418. The cams 440 bear against flaps 442, shown in this embodiment as integral with the stop bar 428. The joint tilting of the tray 418 and the stop bar 428 opens a gap 444 in the perimeter, leading to the auxiliary chute 436. It is to be understood that, in the embodiment shown, the stop bar 428 is free to swing back to a closed position when the tray 418 is lowered to its rest position; in other embodiments, a spring or another cam arrangement can impel stop bar 428 motion. A receiver bottle 446 can be positioned at the exit portal 448 of the auxiliary chute 436, for example by an agent holding the receiver bottle 446 in hand.

It is to be understood that the hinge embodiment presented in FIGS. 9-11 is one of many possible arrangements. For example, mating depressions and protrusions on the respective components can provide hinge function in lieu of identifiable hinge pins and pivots, or separate hinge pins can be used along with bearing fixing holes and/or attachment points in each part to provide hinge function. In other embodiments, multiple components can be molded as a unit from a material sufficiently resilient that the hinge functions can be realized using so-called self-hinges. That is, allowance for repeated bending of the material, such as at purpose-made locations, i.e., self-hinges, can enable the required range and ease of motion without recourse to multiple parts. Similarly, discrete components can be connected with resilient hinge material to accomplish comparable functionality. Selection of one or more of these arrangements or others that will occur to those proficient in the relevant arts may depend on the requirements of a specific embodiment.

The foregoing process may be compared to the process required for an unpivoted tray, as shown in FIG. 2, wherein the agent lifts the tray from the stage, tilts the tray to direct the units into a corner of the tray, then further directs the units into a receiver bottle. It is to be understood that a unit handling arrangement using a pivoted tray and an associated chute may be adaptable to the embodiments of FIGS. 1, 2, and 3.

A greater or lesser security capability may be used in various embodiments. For example, positive identification of an agent bearing a scannable badge may be appropriate, whether to maintain audit trail on controlled substances, to monitor employee productivity, or in view of another consideration. To cite another example, stock bottle bar codes may be associated with unit shape definitions in a database. Positive confirmation of unit shape while counting may assure safety and quality control as well as maintaining audit trail. These or other security aspects may be relevant to particular embodiments.

Various features may be included in the inventive apparatus to augment security. The features may include, for example, control of software configuration modification, so that downloading an altered database of geometric data defining unit shape requires a password or other, more rigorous identification. Stock bottles may be provided with geometric data embedded in a bar code, so that no separate database is required, and the bottle and its contents are logically linked. Regarding technology choice between one-dimensional and two-dimensional bar codes, it is to be understood that the embedded geometry describing a specific unit may be more readily implemented in embodiments employing the longer sequences possible with two-dimensional bar codes.

Other features potentially desirable in some embodiments include a requirement for a long and/or encrypted agent badge code, embedment within the agent badge code of one or more biometrics such as a scan of relative finger length profile, a requirement that a password be changed periodically, or a combination of these and other security measures. It is to be understood that processor-based security functions associated with a counter may include procedures to acquire affirmative information, such as badge code decryption and confirmation, polling of individual subassemblies to acquire and examine condition reports, transmitting test codes and verifying responses, and the like. Thus, an indication that counter security status is good can be derived from an affirmative security test sequence that may be extensive in some embodiments.

Further, negative events may negate a security good indication. For example, a loss of a power good signal from a power supply may generate a processor interrupt for system shutdown without data loss, which can be usable in embodiments where prior system state is needed during restart, for example. Similarly, specific security related or operational negative events may be detected, such as removal of a closure seal on the counter, timeout of a watchdog counter, overtemperature detection from a thermal sensor having go/no go state switching, and the like. Identification of a recognized agent may be viewed as an affirmative security procedure enabling operation, while touching a "standby" button on a touchscreen or absence of agent input, including change in count or position of units on the stage for a stipulated period, may be viewed as a negative security event initiating disablement of operation. Where appropriate, a security bypass function may be applied to override a disablement function and allow operation of at least one function without direct access to the security sequence required for normal operation. Criteria for such bypasses may be developed for individual embodiments.

Alternate embodiments may employ substantially the same counting algorithm as presented in the discussion of FIGS. 6 and 7, using imager heads that may not be fixed and oriented downward toward horizontal stages. Such embodiments, using ambient light, scanning lasers, or pulsed, diffused infrared, among other illuminating radiation sources, may count units at various distances from the imager heads. Applications are not limited to prescription fulfillment, nor to counting functions. In some embodiments, a principal use can be detection of defective frangible items, such as in light bulb quality control monitoring a conveyor belt. In still other embodiments, law enforcement may find uses in counting crowd populations or automobile traffic. Similarly, detection of burned-out streetlights from imagers mounted on cell phone towers, or counting whitecaps from imagers borne on aircraft as an indication of wind speed, may be feasible.

In some embodiments, processing circuitry (e.g., corresponding to processor 66 or 126) associated with the counter (e.g., 10, 32, 52, 60 or 114) may be configured to further annotate or tag data on or associated with graphical images (e.g., graphical image 108) that are generated pursuant to operation of example embodiments using an image processor 500. In this regard, for example, image processor 500, shown in the example of FIG. 12, may be configured to not only determine a number of pills disposed on a stage (e.g., stage 72), but to number each pill (or unit 74) that is detected and also or alternatively provide other annotations to the image data provided. As such, the image processor 500 may be configured to receive image data 510 generated responsive to scanning of a tray by a camera and be further configured to generate annotated image data 520 responsive to further processing performed by the image processor 500. The annotated image data 520 may include image data that has each pill therein numbered and, in some cases, annotation information regarding the pills being processed and/or the prescription being processed and with which the pills are associated. In an example embodiment, the annotated image data 520 may be displayed (e.g., via a user interface) and reviewed by an operator or agent.

Figure 12:
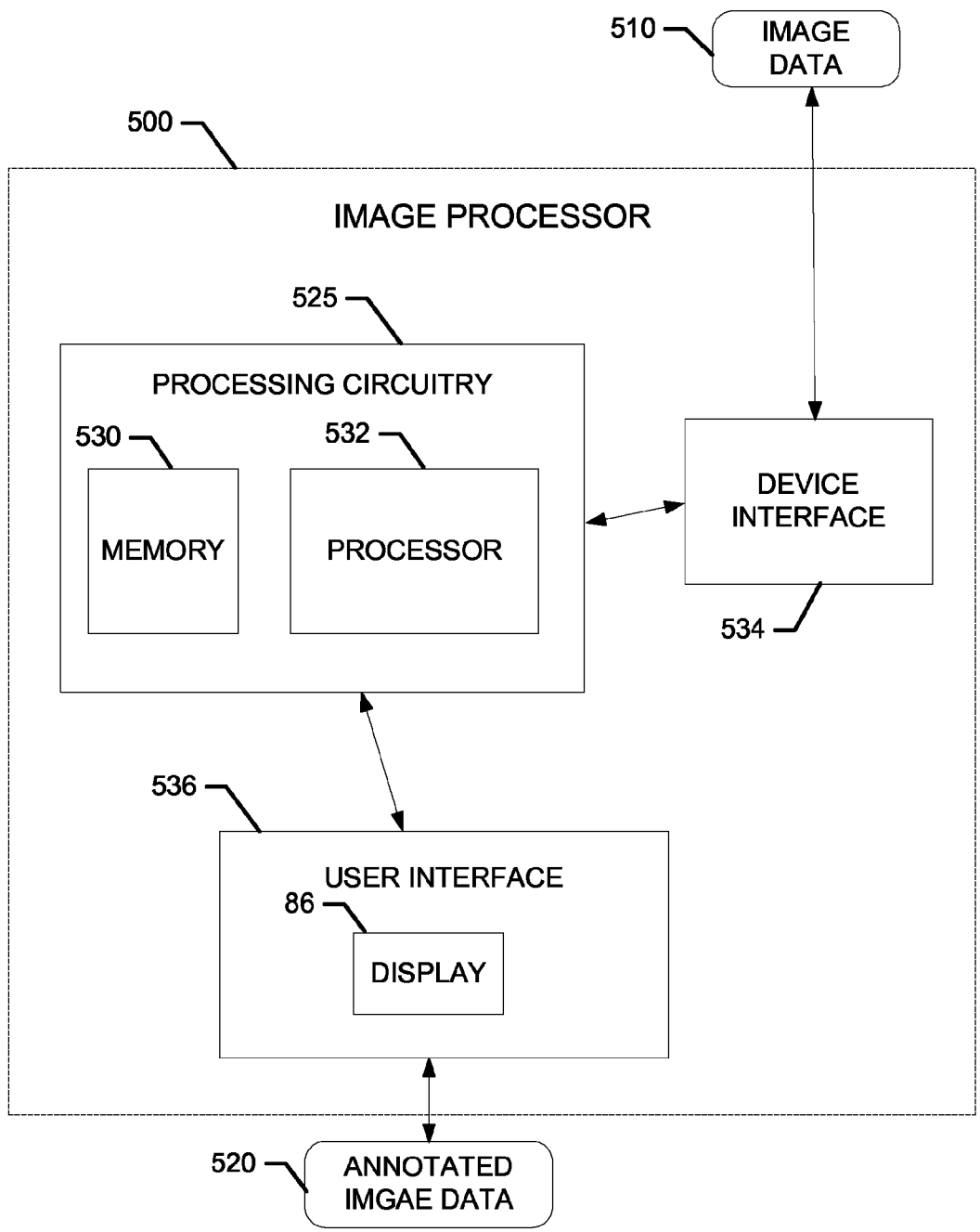
FIG. 12 illustrates a block diagram of an image processor that may be used to implement the processing described in reference to FIGS. 1-11 according to an example embodiment.

FIG. 12 illustrates a block diagram of image processor 500 that may be used to implement the processing described above (in association with processor 66 or 126), and which may be further configured to provide graphical image processing including pill numbering and/or other annotation. In this regard, the image processor 500 may include processing circuitry 525 that may include a processor 530 and memory 532 that may be in communication with or otherwise control a device interface 534 and, in some cases, a user interface 536. As such, the processing circuitry 525 may be embodied as a circuit chip (e.g., an integrated circuit chip) configured (e.g., with hardware, software or a combination of hardware and software) to perform operations described herein. However, in some embodiments, the processing circuitry 525 may be embodied as a portion of an on-board computer.

The user interface 536 (if implemented) may be in communication with the processing circuitry 525 to receive an indication of a user input at the user interface 536 and/or to provide an audible, visual, mechanical or other output to the user. As such, the user interface 536 may include, for example, a display (e.g., a touch screen such as display 86), one or more buttons or keys, and/or other input/output mechanisms. In some embodiments, the user interface 536 may be provided on a panel that forms a portion of or is attached to the base unit. However, in other embodiments, the user interface 536 may be separately provided or may be provided proximate to the camera (as in FIG. 9).

The device interface 534 may include one or more interface mechanisms for enabling communication with other devices (e.g., sensors such as the camera 78 or 406). In some cases, the device interface 534 may be any means such as a device or circuitry embodied in either hardware, or a combination of hardware and software that is configured to receive and/or transmit data from/to sensors and/or input devices in communication with the image processor 500.

In an exemplary embodiment, the memory 532 may include one or more non-transitory memory devices such as, for example, volatile and/or non-volatile memory that may be either fixed or removable. The memory 532 may be configured to store information, data, applications, instructions or the like for enabling the processing circuitry 500 to carry out various functions in accordance with exemplary embodiments of the present invention. For example, the memory 532 could be configured to buffer input data for processing by the processor 530. Additionally or alternatively, the memory 532 could be configured to store instructions for execution by the processor 530. As yet another alternative, the memory 532 may include one or more databases that may store a variety of data sets responsive to input from cameras, scanners and/or the like. Among the contents of the memory 532, applications may be stored for execution by the processor 530 in order to carry out the functionality associated with each respective application. In some cases, the applications may include control applications that perform image processing to number pills and annotate images as described in greater detail below.

The processor 530 may be embodied in a number of different ways. For example, the processor 530 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 530 may be configured to execute instructions stored in the memory 532 or otherwise accessible to the processor 532. As such, whether configured by hardware or by a combination of hardware and software, the processor 530 may represent an entity (e.g., physically embodied in circuitry—in the form of processing circuitry 500) capable of performing operations according to embodiments of the present invention while configured accordingly. Thus, for example, when the processor 530 is embodied as an ASIC, FPGA or the like, the processor 530 may be specifically configured hardware for conducting the operations described herein. Alternatively, as another example, when the processor 530 is embodied as an executor of software instructions, the instructions may specifically configure the processor 530 to perform the operations described herein.

In an example embodiment, the processor 530 (or the processing circuitry 525) may be embodied as, include or otherwise control the image processor 500 with respect to the annotation and image processing functions described herein. As such, in some embodiments, the processor 530 (or the processing circuitry 525) may be said to cause each of the operations described in connection with the image processor 500 by directing the image processor 500 to undertake the corresponding functionalities responsive to execution of instructions or algorithms configuring the processor 530 (or processing circuitry 525) accordingly. As an example, the image processor 500 may be configured to control image processing and/or annotation as described herein. In particular, the image processor 500 may be configured to process image data (e.g., the received image data 510) to number each pill and/or annotate the image data to provide the annotated image data 520.

In an example embodiment, the numbering of each pill may be accomplished by, for example, attaching a corresponding incrementally increasing number to each of the pills that is detected and classified as a pill on the graphical image produced. Thus, for example, debris or fragments that are not of sufficient to be classified as a pill may not have a number attached thereto. In some embodiments, the attachment of the number may be performed by overlaying each incremental number over the top of the corresponding pill. Thus, for example, if sixty pills are counted. Each pill will have a distinct number from 1 to 60 attached thereto (or overlaid thereon) by the image processor 500.

Figure 13A:
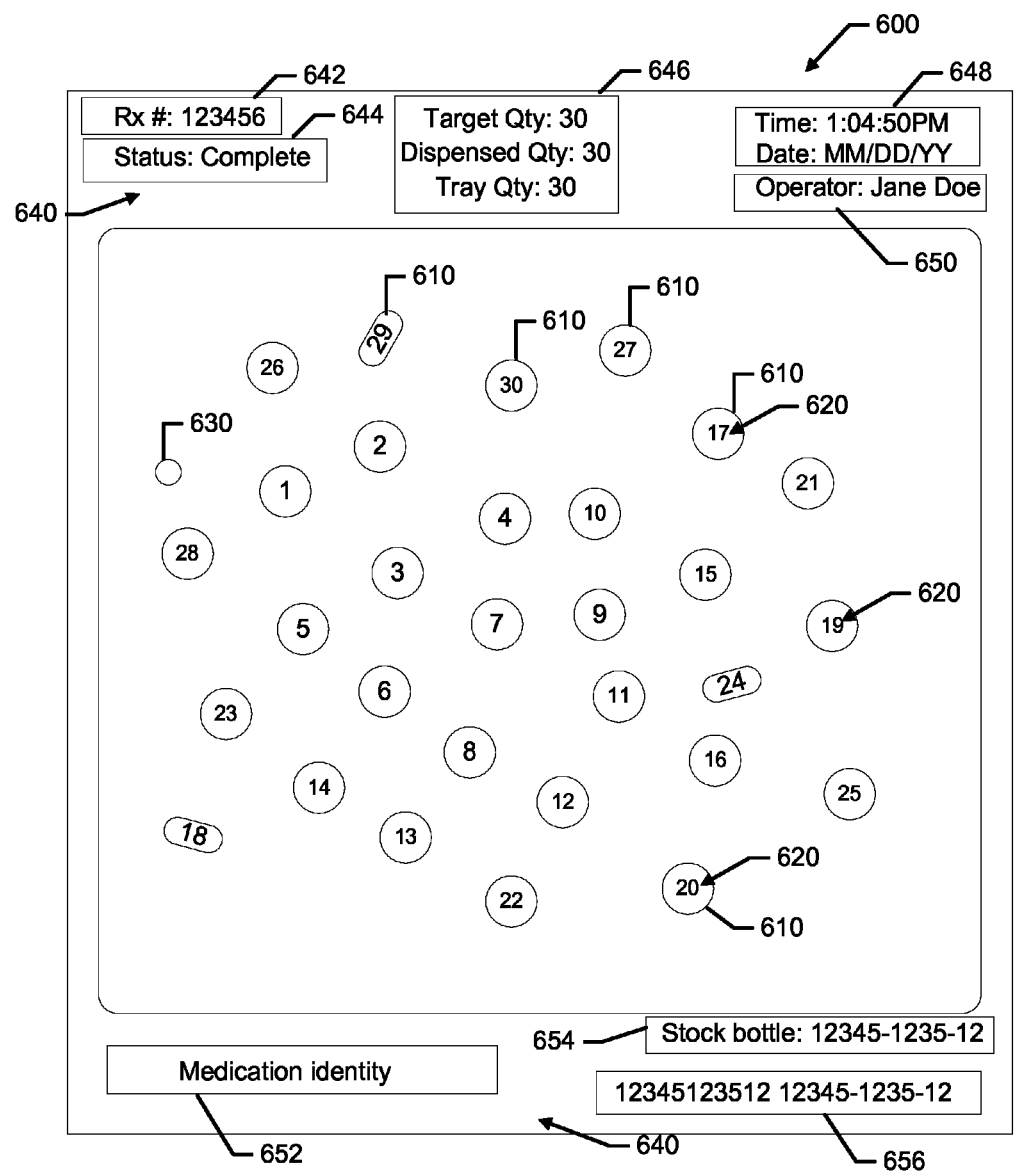
FIG. 13 illustrates an example annotated image according to an example embodiment.
Figure 13B:
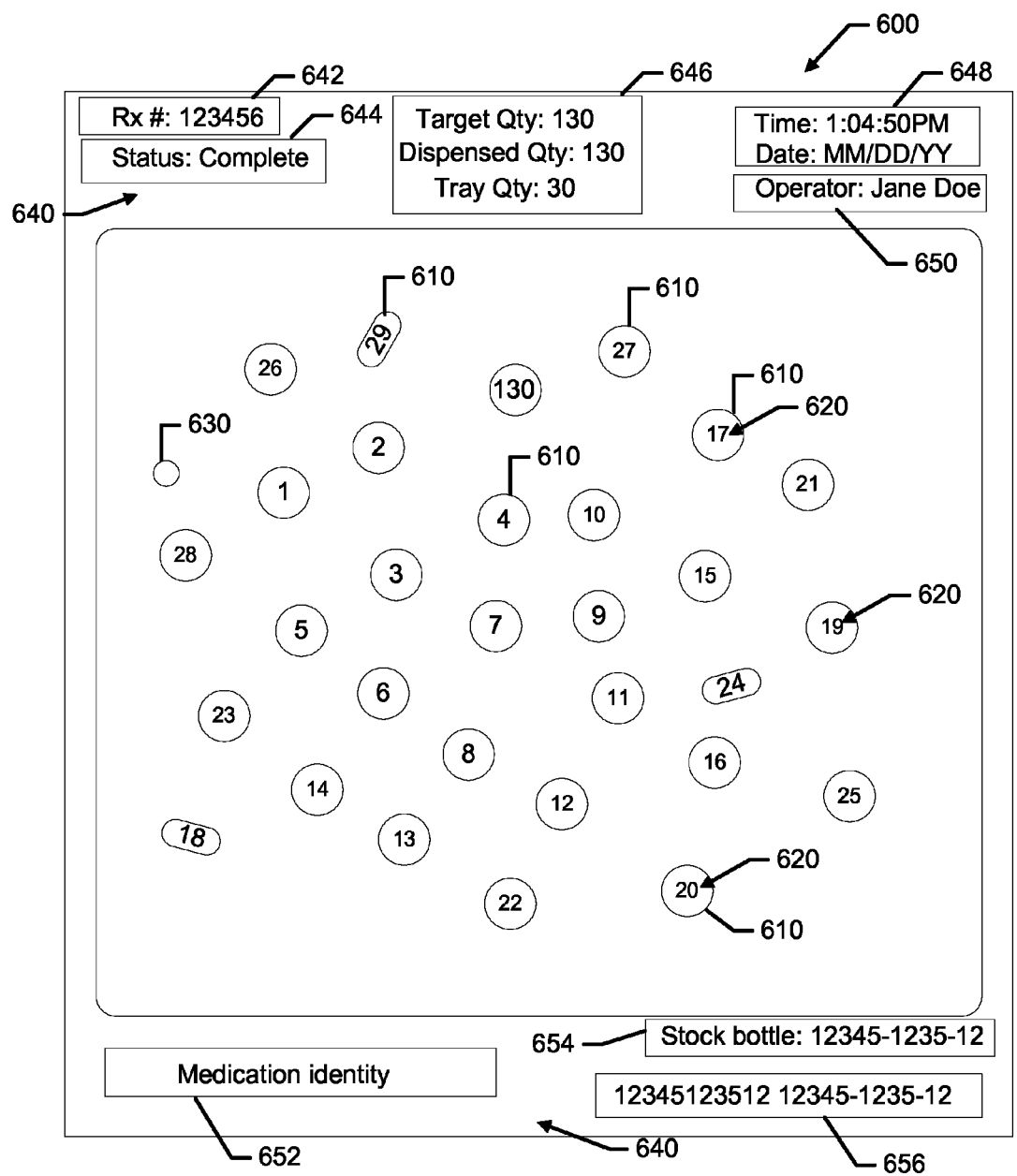

FIG. 13, which includes FIGS. 13A and 13B, illustrates two example images produced in accordance with an example embodiment. In this regard, FIG. 13A shows an example annotated image 600 in which thirty pills 610 are shown for ease of explanation. As shown in FIG. 13A, each of the pills 610 is numbered from 1 to 30 (as indicated by example pill number overlays 620). Notably, even pills on their side (e.g., pill numbers 18, 24 and 29) can be recognized (as described above) and classified as pills. However, a pill fragment 630 that does not have a geometry corresponding to either a flat oriented pill or a pill lying on its side (e.g., like pill numbers 18, 24 and 29) may therefore not be numbered by the image processor. When reviewing the annotated image 600, the pill fragment 630 (if one or more should exist), may be easily identifiable by the operator or agent since it will not include a pill number overlay 620 associated therewith.

In an example embodiment, annotation data 640 may also be provided around a border portion of the annotated image 600. The annotation data 640 of FIG. 13A is shown to include data disposed in border portions above and below the image data. However, it should be appreciated that the annotation data 640 may be disposed at any portion of the annotated image 600. As shown in FIG. 13A, a prescription number, a status and an identity of the operator may be provided as a part of the annotation data 640 in corresponding fields for each respective entry. In some embodiments, an indication of the target quantity, the dispensed quantity and the tray quantity may also be provided along with time and date information in corresponding additional fields. Pill identification information of the corresponding medication (e.g., pill generic name or brand name and/or medication type) may also be provided among the annotation data 640. Stock bottle identification information may also be provided to show the stock number (or numbers) associated with the bottle (or bottles) from which the pills have been drawn.

The prescription number may be provided in a transaction field 642 when the counter operates in a validation mode. Meanwhile, in a count mode, a transaction number may be displayed in the transaction field 642. The status may be provided in a completion status field 644. Possible values may include "partial," "complete," "over fill," "completion of partial" or "count only" in some embodiments. Quantity fields 646 may be provided to include the indication of the target quantity, the dispensed quantity and the tray quantity. The target quantity may define the quantity required for a corresponding prescription. The dispensed quantity may indicate the quantity dispensed for a current fill of the prescription. The tray quantity may indicate the number of pills on the tray in a current image. This would typically be the same value as the dispensed quantity unless an accumulation mode is being used.

The date and time information may be provided in a date and time field 648 to record the date and time at which completion of operations is achieved (e.g., as indicated by a finish button or entry being input) for a prescription filling operation. The identity of the operator may be provided in a user ID field 650, which identifies the logged in user. A drug label field 652 may be provided to identify the name of the drug being dispensed. In some cases, a prescription label NDC field 654 may also be provided to indicate the NDC number called for by the prescription in the validation mode. In count mode, the NDC field 654 may indicate "N/A." An actual stock bottle field 656 may also be provided in order to display the UPC code, NDC number and/or other corresponding information of the stock bottle that was scanned for the dispensed drug. When multiple bottles are used, multiple lines may be provided in the actual stock bottle field 656. In some cases, NDCs will only be accepted if all digits except a predetermined number (e.g., the last two) are the same as the scanned verification label.

FIG. 13A illustrates a simple example of counting in a non-accumulation mode. However, it should be appreciate that an accumulation mode may alternatively be employed in which data shown in a current image may be accumulated together with data corresponding to one or more prior images as shown in the example of FIG. 13B. In embodiments where the number (e.g., a three or four digit number) is too large to fit on the pill, some examples may drop the most significant digit off of all pills except for the highest valued pill (as shown in FIG. 13B).

In some embodiments, the prescription number 640 may be obtained by scanning information on a reference document such as a previously prepared prescription label (e.g., via an optical reading device, such as the barcode scanner 94). Meanwhile, the stock bottle identification information may be obtained responsive to scanning information on associated with a barcode on an information label of a medication vial or bottle (e.g., via an optical reading device, such as the barcode scanner 94). In some examples, the annotated image 600 may be stored (e.g., in memory 532). As such, the annotated image 600 may be displayed in real time and/or may be displayed responsive to retrieval from memory. In an example embodiment, any one of the items that form the annotation data 640 may be used as an organizational parameter based upon which the annotated image 600 may be stored, searched and/or retrieved.

By providing annotation data 640 on the annotated image 600, a reviewer may be enabled to quickly determine the type of medication to which the image corresponds. The reviewing may also be able to determine when the image was produced and whether the result shown represents a correctly filled prescription. The image processor 500 may therefore be enabled to operate in a count mode, where pills are counted and an annotated image is produced and possibly also displayed responsive to such operation, or a verification mode, where a stored annotated image is retrieved and/or displayed to enable the operator to verify and/or provide evidence related to the results of a prior counting operation. Further, as indicated above, the count mode may include accumulation and non-accumulation modes of operation.

When operating in verification mode, the image processor 500 may be configured to provide an operator with an ability to navigate a menu structure listing functions relative to looking up or searching for specific, previously stored images (e.g., tray photos). In some examples, the image processor 500 may be configured to provide the operator with a search field that may be filled with a prescription number or an NDC number. In some cases, a date may be provided. Otherwise, a listing of all matching data corresponding to the provided prescription number and/or NDC number may be provided with corresponding dates, and the operator may select the dated material that is of interest.

In some embodiments, the memory 532 may be organized into folders and/or sub-folders that corresponding to specific prescription numbers, NDC numbers, dates, patient names, or other useful organizational structures according to which image data may be stored to enable remote access to images of interest. Moreover, in some embodiments, image data may be copied to removable memory devices or may be transferred over a network to other devices to facilitate remote access to image data.

In an example embodiment, the memory 532 may store image data responsive to a specific operator entry or command directing image storage. However, in some cases, it may be desirable to have image data storage occur, at least on a temporary basis, in an automated fashion. Accordingly, for example, the memory 532 of some example embodiments may further include an image buffer configured to buffer a predetermined number of recent images (e.g., 5, 10, 100, etc.) that may be automatically generated responsive to a count operation. In this regard, for example, the image processor 500 may be configured to trigger storage of an image in the image buffer responsive to a stable count being detected or at predetermined points associated with a count process. If the operator thereafter provides an entry to save an image, one of the buffered images may be selected to be saved (e.g., a "middle of the buffer" image having a count that matches the saved count).

In some embodiments, the image processor 500 may be further configured to detect situations where the operator has forgotten to save image data and inform the operator or otherwise solicit instructions from the operator. For example, the image processor 500 may be configured to detect situations where the count goes to zero from a stable non-zero value (e.g., indicating a successfully completed count operation) where the operator has not saved any data when the stable non-zero value was achieved. In such a situation, the image processor 500 may prompt the user to determine whether image data associated with the previously achieved stable non-zero value should be saved. If the operator elects to save the image data, the image processor 500 may retrieve image data from the image buffer and store it accordingly. In some cases, when previously buffered data is stored permanently, the buffer may be cleared of the corresponding data.

In some embodiments, the image processor 500 may be configured to check recent activity associated with a particular prescription number prior to completing a fill operation. For example, in response to scanning of a prescription number, the image processor 500 may refer to a transaction record stored in association with the prescription number to determine whether a most recent fill of the prescription was a partial fill. If a partial fill is detected, the image processor 500 may be configured to inform the user of the partial fill. In some cases, the image processor 500 may further identify the number of pills filled relative to the total number that should have been filled for the prescription. The operator may then be prompted as to whether the operator would like to proceed with a full fill of the prescribed quantity or just fill the remainder needed to complete the filling of the prescription. If selection of the option for filling the remainder is made, the target quantity for filling the prescription may be adjusted down accordingly.

In some embodiments, the operator may also be enabled to record that the full stock bottle quantity of any particular stock bottle has been used to fill a prescription. Accordingly, for example, if a still-sealed stock bottle is dispensed, it may not be necessary to open the bottle and pour it out to enable counting. Other counting operation enhancements may also be provided. For example, in some embodiments, certain prescriptions involving heightened sensitivity or legal requirements such as narcotics, other controlled substances, or expensive drugs may receive special treatment. In this regard, for example, controlled substances may be required (e.g., legally or as a matter best practices) to be double counted. When such requirements exist, the image processor 500 may be programmed to request a double count or otherwise inform the operator of the requirement to facilitate ensuring accuracy of counting.

Figure 14:
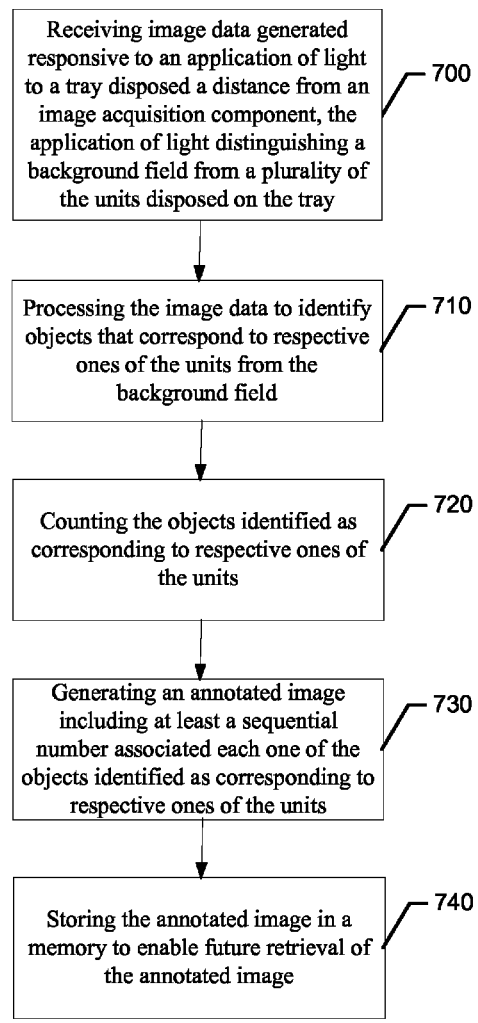
FIG. 14 is a flowchart of a system, method and program product according to example embodiments of the invention.

FIG. 14 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 14, when executed, convert a computer or processing circuitry into a particular machine configured to perform an example embodiment of the present invention. Accordingly, the operations of FIG. 14 define an algorithm for configuring a computer or processing circuitry 525 (e.g., processor 530) to perform an example embodiment. In some cases, a general purpose computer may be provided with an instance of the image processor 500, which performs the algorithm shown in FIG. 14 (e.g., via configuration of the processor 530), to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, one embodiment of a method for processing graphical image data representing pills or other medication related units, as shown in FIG. 14, includes receiving image data generated responsive to an application of light to a tray disposed a distance from an image acquisition component at operation 700. The application of light may distinguish a background field from a plurality of the units disposed on the tray. The method may further include processing the image data to identify objects that correspond to respective ones of the units from the background field at operation 710, counting the objects identified as corresponding to respective ones of the units at operation 720, and generating an annotated image including at least a sequential number associated each one of the objects identified as corresponding to respective ones of the units at operation 730.

In some embodiments, certain ones of the operations above may be modified or further amplified as described below. Moreover, in some embodiments additional optional operations may also be included (an example of which is shown in dashed lines in FIG. 14). It should be appreciated that each of the modifications, optional additions or amplifications below may be included with the operations above either alone or in combination with any others among the features described herein. In an example embodiment, the method may store the annotated image in a memory to enable future retrieval of the annotated image at operation 740. In some cases, the method may further include generating the annotated image further may include applying a respective sequential overlay number to each of the identified as corresponding to respective ones of the units (e.g., via applying sequential numbers to respective ones of the objects identified from one to a total number determined responsive to the counting), generating one or more annotations descriptive of a prescription with which the annotated is associated, generating one or more annotations descriptive of a medication with which the annotated is associated, generating one or more annotations descriptive of a medication container with which the annotated is associated and/or generating a time annotation, date annotation, target quantity, dispensed quantity or tray quantity of units responsive to the counting.

In an example embodiment, an apparatus for performing the method of FIG. 14 above may comprise a processing circuitry (e.g., processing circuitry 525) configured to perform some or each of the operations (700-740) described above, with or without some or all of the modifications described above. The processing circuitry 525 may, for example, be configured to perform the operations (700-740) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 700-740 may comprise, for example, the image processor 500. Additionally or alternatively, at least by virtue of the fact that the processing circuitry 525 may be configured to control or even be embodied as the image processor 500, the processing circuitry 525 and/or a device or circuitry for executing instructions or executing an algorithm for processing information as described above may also form example means for performing operations 700-740.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method of processing graphical image data representing optically scanned medication-related units comprising:
    receiving image data generated responsive to an application of light to a tray disposed a distance from an image acquisition component, the application of light distinguishing a background field from a plurality of the units disposed on the tray;
    processing the image data to identify objects that correspond to respective ones of the units from the background field;
    counting the objects identified as corresponding to respective ones of the units; and
    generating an annotated image including at least a sequential number associated with each one of the objects identified as corresponding to respective ones of the units,
    wherein generating the annotated image further comprises generating one or more annotations descriptive of a prescription with which the annotated image is associated.

2. The method of claim 1, wherein generating the annotated image further comprises applying a respective sequential overlay number to each of the objects identified as corresponding to respective ones of the units.

3. The method of claim 2, wherein applying the respective sequential overlay number comprises applying sequential numbers to respective ones of the objects identified from one to a total number determined responsive to the counting.

4. The method of claim 1, wherein generating the annotated image further comprises generating one or more annotations descriptive of a medication with which the annotated image is associated.

5. The method of claim 1, wherein generating the annotated image further comprises generating one or more annotations descriptive of a medication container with which the annotated image is associated.

6. The method of claim 1, wherein generating the annotated image further comprises generating a time annotation, date annotation, target quantity, dispensed quantity or tray quantity of units responsive to the counting.

7. The method of claim 1, further comprising storing the annotated image in a memory to enable future retrieval of the annotated image.

8. A machine-vision based counting device for counting medication-related units comprising:
    a tray disposed on a base unit to receive units;
    an image acquisition component disposed a distance from the tray, the image acquisition component configured to generate image data responsive to an application of light to the tray, the application of light distinguishing a background field from the units disposed on the tray;

an image processor comprising processing circuitry configured to:

process the image data to identify objects that correspond to respective ones of the units from the background field;

count the objects identified as corresponding to respective ones of the units; and generate an annotated image including at least a sequential number associated each one of the objects identified as corresponding to respective ones of the units, wherein the processing circuitry is further configured to generate the annotated image by generating one or more annotations descriptive of a prescription with which the annotated image is associated.

9. The device of claim 8, wherein the processing circuitry is further configured to generate the annotated image by applying a respective sequential overlay number to each of the objects identified as corresponding to respective ones of the units.

10. The device of claim 9, wherein the processing circuitry is further configured to apply the respective sequential overlay number by applying sequential numbers to respective ones of the objects identified from one to a total number determined responsive to the counting.

11. The device of claim 8, wherein the processing circuitry is further configured to generate the annotated image by generating one or more annotations descriptive of a medication with which the annotated image is associated.

12. The device of claim 8, wherein the processing circuitry is further configured to generate the annotated image by generating one or more annotations descriptive of a medication container with which the annotated image is associated.

13. The device of claim 8, wherein the processing circuitry is further configured to generate the annotated image by generating a time annotation, date annotation, target quantity, dispensed quantity or tray quantity of units responsive to the counting.

14. The device of claim 8, further comprising a memory configured to store the annotated image in a memory to enable future retrieval of the annotated image; and a display configured to display the annotated image.

15. A computer program product comprising at least one non-transitory computer-readable storage medium having computer-executable program code instructions stored therein, the computer-executable program code instructions comprising program code instructions for:

receiving image data generated responsive to an application of light to a tray disposed a distance from an image acquisition component, the application of light distinguishing a background field from a plurality of the units disposed on the tray;

processing the image data to identify objects that correspond to respective ones of the units from the background field;

counting the objects identified as corresponding to respective ones of the units; and generating an annotated image including at least a sequential number associated with each one of the objects identified as corresponding to respective ones of the units, wherein program code instructions for generating the annotated image include instructions for:

generating one or more annotations descriptive of a prescription with which the annotated image is associated;

generating one or more annotations descriptive of a medication with which the annotated image is associated;

generating one or more annotations descriptive of a medication container with which the annotated image is associated; or generating a time annotation, date annotation, target quantity, dispensed quantity or tray quantity of units responsive to the counting.

16. The computer program product of claim 15, wherein program code instructions for generating the annotated image include instructions for applying a respective sequential overlay number to each of the objects identified as corresponding to respective ones of the units.

17. The computer program product of claim 15, further comprising computer program code for storing the annotated image in a memory to enable future retrieval of the annotated image.

* * * * *

UNITED STATES PATENT AND TRADEMARK OFFICE
CERTIFICATE OF CORRECTION

| | |
|---|---|
| PATENT NO. | : 8,682,047 B2 |
| APPLICATION NO. | : 13/310952 |
| DATED | : March 25, 2014 |
| INVENTOR(S) | : David A. Lang and David A. Yanez |

Page 1 of 1

It is certified that error appears in the above-identified patent and that said Letters Patent is hereby corrected as shown below:

In the Claims:

At column 23, Claim 8, line 11, "associated each one" should read --associated with each one--

Signed and Sealed this
Seventeenth Day of June, 2014

Michelle K. Lee
*Deputy Director of the United States Patent and Trademark Office*